(12) United States Patent
Sumitomo et al.

(10) Patent No.: US 9,117,135 B2
(45) Date of Patent: Aug. 25, 2015

(54) CORRESPONDING POINT SEARCHING APPARATUS

(75) Inventors: Hironori Sumitomo, Moriguchi (JP); Osamu Toyama, Kakogawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/129,660

(22) PCT Filed: May 22, 2012

(86) PCT No.: PCT/JP2012/003317
§ 371 (c)(1),
(2), (4) Date: Dec. 27, 2013

(87) PCT Pub. No.: WO2013/001710
PCT Pub. Date: Jan. 3, 2013

(65) Prior Publication Data
US 2014/0147049 A1  May 29, 2014

(30) Foreign Application Priority Data
Jun. 29, 2011 (JP) ................................. 2011-144828

(51) Int. Cl.
*G06K 9/46* (2006.01)
*G06K 9/36* (2006.01)
*G06T 7/00* (2006.01)

(52) U.S. Cl.
CPC ............. *G06K 9/36* (2013.01); *G06T 7/0075* (2013.01); *G06T 2207/10021* (2013.01); *G06T 2207/20016* (2013.01); *G06T 2207/20056* (2013.01)

(58) Field of Classification Search
USPC ........................................ 382/190, 209, 108
See application file for complete search history.

(56) References Cited

U.S. PATENT DOCUMENTS

| 2002/0038294 | A1* | 3/2002 | Matsugu ........................ 706/20 |
| 2008/0013836 | A1* | 1/2008 | Nakamura et al. ............ 382/209 |
| 2009/0010530 | A1 | 1/2009 | Sumitomo |
| 2013/0336540 | A1* | 12/2013 | Zhang et al. .................. 382/108 |

FOREIGN PATENT DOCUMENTS

| JP | 2007-179354 | 7/2007 |
| JP | 2008-209275 | 9/2008 |

(Continued)

OTHER PUBLICATIONS

International Search Report in International Application No. PCT/JP2012/003317 mailed Jun. 19, 2012, 2 pages.

(Continued)

*Primary Examiner* — Yon Couso
(74) *Attorney, Agent, or Firm* — Brinks Gilson & Lione

(57) ABSTRACT

A corresponding point candidate determiner (108) determines whether plural correlation peaks appear, based on a correlation value calculated by a corresponding point determiner (107). In the case where the corresponding point candidate determiner (108) determines that plural correlation peaks appear, the corresponding point determiner (107) calculates a ratio between the correlation values as represented by the correlation peaks, determines one or more corresponding points, based on the calculated ratio, and notifies the determination result to an initial position setter (106). In the case where the corresponding point determiner (107) searches plural corresponding points, the initial position setter (106) sets an initial search position with respect to each of the corresponding points in a reference image of a layer immediately higher than a target layer.

19 Claims, 16 Drawing Sheets

(56) References Cited

FOREIGN PATENT DOCUMENTS

| | | | |
|---|---|---|---|
| JP | 2008-216126 | * | 9/2008 |
| JP | 2009-015696 | | 1/2009 |
| JP | 2009-15696 | * | 1/2009 |
| JP | 2009-282762 | | 12/2009 |
| JP | 2009-294733 | | 12/2009 |

OTHER PUBLICATIONS

Written Opinion in International Application No. PCT/JP2012/003317 mailed Jun. 19, 2012, 4 pages.

Extended European Search Report for corresponding Application No. 12805045.7, dated Mar. 16, 2015 (8 pages).

Liu, J., et al., "Stereo and motion correspondence in a sequence of stereo images", Signal Processing: Image Communication, vol. 5, No. 4, Oct. 1993, pp. 305-318.

Matthies, L., et al., "Computer vision on Mars", International Journal of Computer Vision, vol. 75, No. 1, Mar. 20, 2007, pp. 67-92.

Emmenlauer, M. et al., "XuvTools: free, fast and reliable stitching of large 3D datasets", Journal of Microscopy, vol. 233, No. 1, Jan. 2009, pp. 42-60.

* cited by examiner

FIG. 7B
FIG. 7C
FIG. 7A
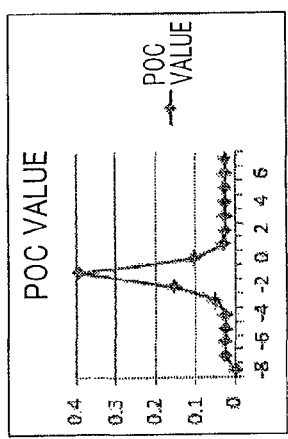
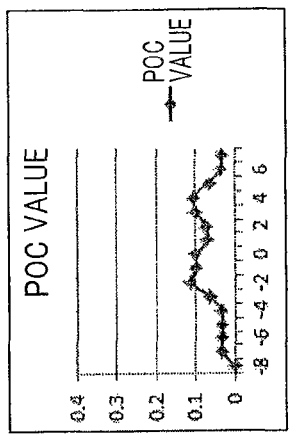

CORRESPONDING POINT SEARCHING APPARATUS

TECHNICAL FIELD

The invention relates to a technology of searching a corresponding point corresponding to a target point in a standard image from a reference image.

BACKGROUND ART

In recent years, there is known a corresponding point searching method such that a plurality of standard images having resolutions different from each other and a plurality of reference images having resolutions different from each other are hierarchically generated respectively from a standard image and a reference image, a search region is set in an upper layer based on a corresponding point searched in a lower layer, and a corresponding point is searched in the set search region. Such a corresponding point searching method is called as a multi-resolution strategy.

For instance, patent literature 1 discloses a technology, in which a degree of reliability for evaluating the reliability of a corresponding point is calculated, a corresponding point having a low degree of reliability is changed to another corresponding point, and an initial search position in a layer immediately higher than a target layer is determined based on the new corresponding point.

In the aforementioned corresponding point searching method utilizing a multi-resolution strategy, a target point is set in a standard image, a correlation value with respect to the target point is obtained at each of positions in a search region set in a reference image, and a position having a largest correlation value among the correlation values is determined as a corresponding point. The correlation values are calculated with use of e.g. an SAD method or a POC method.

The aforementioned corresponding point searching method is carried out, based on the premise that a subject is present at a distance substantially equal to the distance from a camera within a search region.

However, there is a case that plural subjects having subject distances different from the distance from the camera are present in a search region. In such a case, plural sharp correlation peaks may appear within the search region. If such plural sharp correlation peaks appear, it is difficult to determine which one of the correlation peaks represents a true corresponding point.

CITATION LIST

Patent Literature

Patent literature 1: JP 2009-282762A

SUMMARY OF INVENTION

In view of the above, an object of the invention is to provide a corresponding point searching apparatus that enables to precisely acquire a corresponding point, even in the case where plural correlation peaks appear in a certain layer in use of a multi-resolution strategy.

A corresponding point searching apparatus according to an aspect of the invention is provided with an image acquirer which acquires one of at least two input images as a standard image, and a rest of the input images as a reference image; a multi-resolution image generator which hierarchically generates a plurality of standard images having resolutions different from each other and a plurality of reference images having resolutions different from each other respectively from the standard image and the reference image acquired by the image acquirer; a corresponding point searching section which searches a corresponding point corresponding to a target point in a standard image of a target layer from a reference image of the target layer; an initial position setter which sets an initial search position in the reference image of the target layer, based on a corresponding point searched in a layer immediately lower than the target layer; and a search controller which causes the corresponding point searching section to sequentially search a corresponding point from a lower layer toward an upper layer. The corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear. In the case where the corresponding point searching section retrieves plural corresponding points, the initial position setter sets the initial search position with respect to each of the corresponding points.

BRIEF DESCRIPTION OF THE DRAWINGS

FIGS. 7A to 7C are graphs for describing a problem involved in a conventional method, wherein FIG. 7A is a graph showing a distribution of POC values, in the case where two correlation peaks appear in a layer L(i), and FIGS. 7B and 7C are graphs showing a distribution of POC values in a layer L (i−1) immediately higher than the layer L(i);

DESCRIPTION OF EMBODIMENTS

Figure 1:
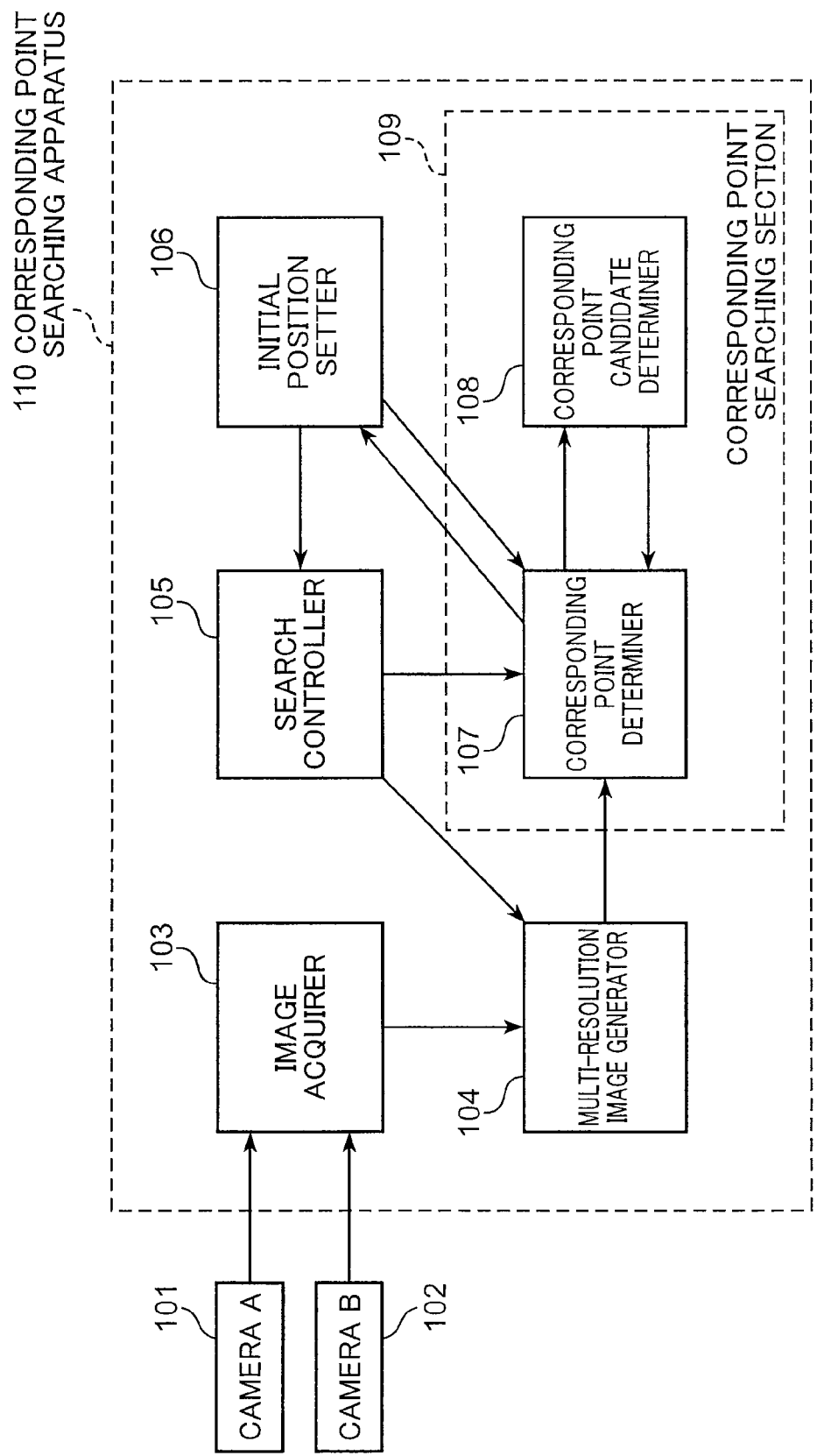
FIG. 1 is a block diagram of a corresponding point searching system to which a corresponding point searching apparatus embodying the invention is applied.

In the following, a corresponding point searching apparatus embodying the invention is described referring to the drawings. FIG. 1 is a block diagram of a corresponding point searching system to which a corresponding point searching apparatus embodying the invention is applied. The corresponding point searching system is loaded in a vehicle body of a vehicle such as an automotive vehicle, and is provided with a camera 101 (a camera A), a camera 102 (a camera B), and a corresponding point searching apparatus 110.

The cameras 101 and 102 are disposed to be spaced apart from each other with a predetermined gap in left and right directions orthogonal to a moving direction of the vehicle body and in parallel to a horizontal direction, and to be symmetrically to each other with respect to the moving direction of the vehicle body at the same height position as each other for capturing an image in a forward direction of the vehicle body at a predetermined frame rate. In this example, the optical axes of the cameras 101 and 102 are parallel to each other.

Further, the cameras 101 and 102 are controlled to synchronize photographing timings thereof so that frames are photographed at a same point of time. The number of cameras is not limited to two, but three or more cameras may be used.

The corresponding point searching apparatus 110 is constituted of e.g. a micro controller, and executes a corresponding point search processing with respect to two images captured at a point of time t with use of the cameras 101 and 102, for instance.

Specifically, the corresponding point searching apparatus 110 is provided with an image acquirer 103, a multi-resolution image generator 104, a search controller 105, an initial position setter 106, and a corresponding point searching section 109. The corresponding point searching section 109 is provided with a corresponding point determiner 107 and a corresponding point candidate determiner 108.

The image acquirer 103 acquires an input image photographed by the camera 101 as a standard image, acquires an input image photographed by the camera 102 as a reference image, and stores the input images into an unillustrated memory. An example of the input image is digital image data configured such that pixels having 256 gradation values from 0 (black) to 255 (white) are arranged in a matrix.

In the case where the number of cameras is three or more, an input image captured by one of the cameras is used as a standard image, and input images captured by the rest of the cameras are respectively used as reference images.

The multi-resolution image generator 104 respectively and hierarchically generates plural standard images having resolutions different from each other and plural reference images having resolutions different from each other by allowing the standard image and the reference image acquired by the image acquirer 103 to undergo resolution reduction respectively in such a manner that the resolution is increased from a lower layer toward an upper layer. In this example, it is possible to set the number of layers to a predetermined value, and it is possible to set the resolution of each layer to a predetermined value. Further, it is possible to use an image which has not undergone resolution reduction, as a standard image of an uppermost layer and as a reference image of an uppermost layer. Further, the resolution of the standard image and the resolution of the reference image are the same as each other in a same layer. Further, a certain layer to be processed out of the layers of standard images and the layers of reference images is described as a "target layer".

Figure 2:
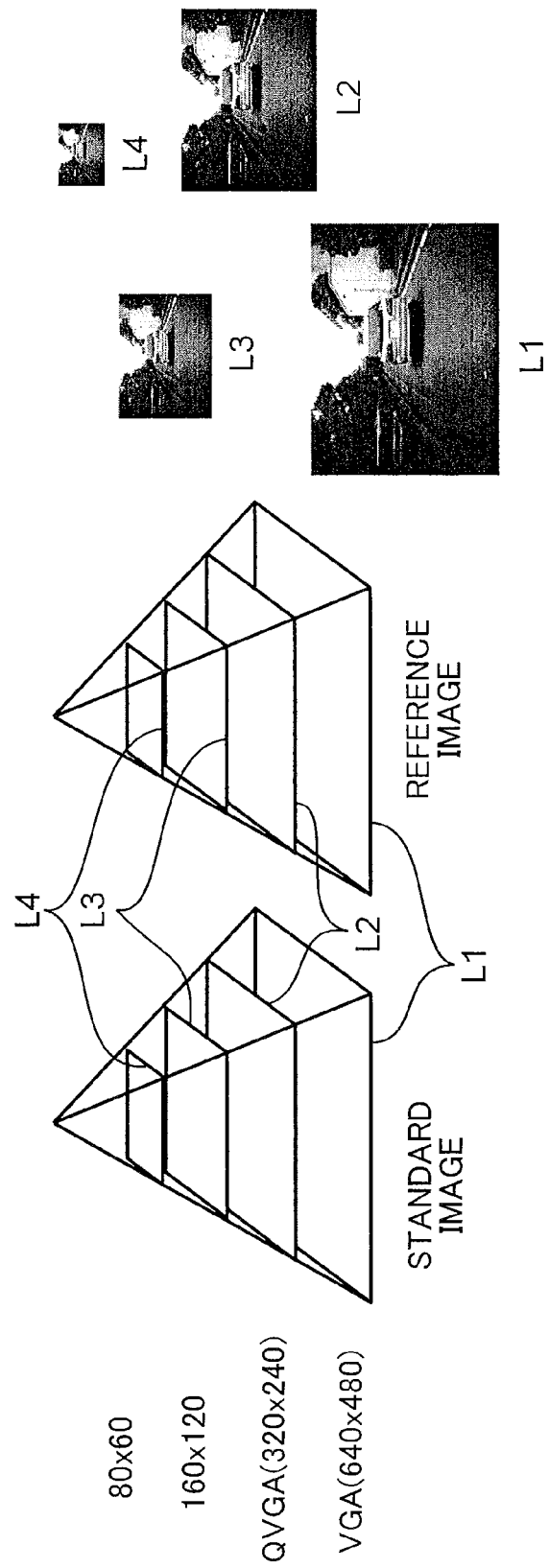
FIG. 2 is a diagram showing a standard image and a reference image, each of which is processed into multi-resolution images of different layers by a multi-resolution image generator.

FIG. 2 is a diagram showing a standard image and a reference image, which have been processed into multi-resolution images of different layers by the multi-resolution image generator 104. In the example of FIG. 2, the number of layers is four. Further, in the example of FIG. 2, the resolution of an input image is VGA (640×480), and the conversion magnification of resolution between layers is set to ½.

Accordingly, the resolution of the standard image of the first layer L1 (uppermost layer) and the resolution of the reference image of the first layer L1 (uppermost layer) are respectively VGA. Further, the resolution of the standard image of the second layer L2 and the resolution of the reference image of the second layer L2 are respectively QVGA (320×240). Further, the resolution of the standard image of the third layer L3 and the resolution of the reference image of the third layer L3 are respectively (160×120). Further, the resolution of the standard image of the fourth layer L4 (lowermost layer) and the resolution of the reference image of the fourth layer L4 (lowermost layer) are respectively (80×60).

For instance, a certain point (x, y) in the third layer L3 is obtained as an average value of 2×2 pixels as represented by the points (2x, 2y), (2x+1, 2y), (2x, 2y+1), and (2x+1, 2y+1) in the second layer L2.

The conversion magnification is not limited to ½, but may be set to ⅓ so as to reduce the number of layers. The above modification makes it possible to perform a high-speed processing.

Conversely, the conversion magnification may be set to $1/1.5$ so as to increase the number of layers. The above modification makes it possible to perform a fine search, despite that the number of layers increases and the computation load increases. This is advantageous in enhancing the robustness.

Further, it is not necessary to make the conversion magnification equal between layers. For instance, the conversion magnification may be set to a small value in an upper layer, and the conversion magnification may increase toward a lower layer.

Using a single search region in all the layers may result in the presence of plural subjects having different subject distances within the search region set in a lower layer. In other words, a variety of subject distances are present in the search region of a lower layer.

In view of the above, increasing the conversion magnification toward a lower layer leads to an increase in the number of layers having a low resolution. This makes it possible to perform a fine search of a corresponding point in a lower layer, and makes it possible to secure the robustness. Further, the above configuration makes it possible to reduce the number of layers having a high resolution. This gives more importance to high-speed processing than robustness in an upper layer. Accordingly, it is possible to perform a corresponding point search processing in a well-balanced manner over the entirety of images from a lower layer to an upper layer.

Figure 3:
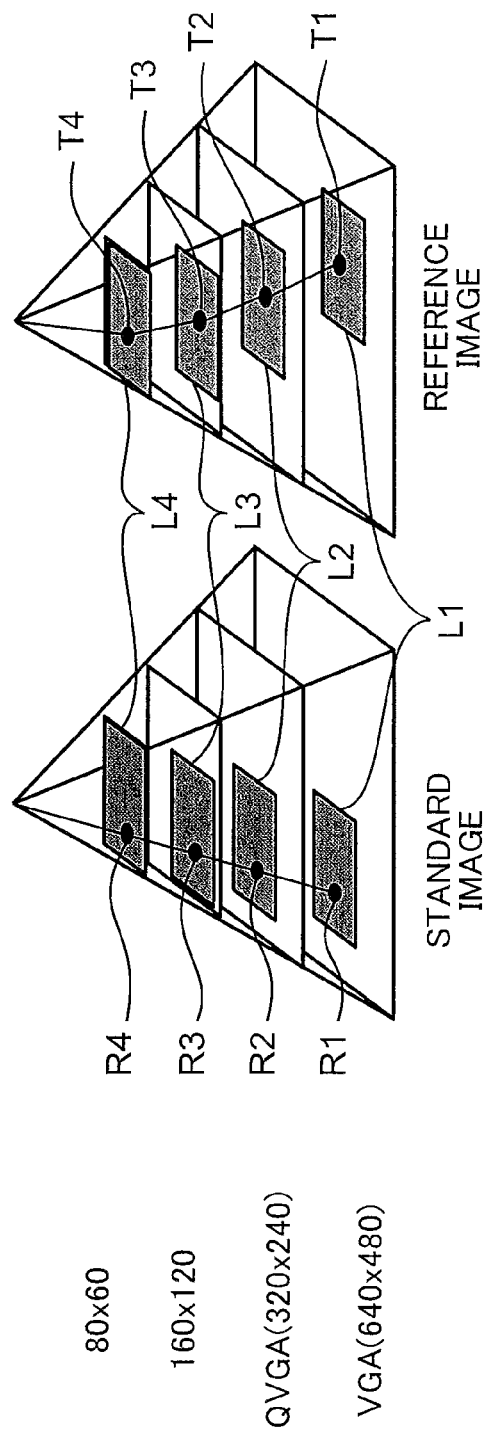
FIG. 3 is a diagram showing a flow of processing to be performed by a corresponding point determiner for searching a corresponding point under the control of a search controller.

Referring back to FIG. 1, the search controller 105 causes the corresponding point determiner 107 to sequentially search a corresponding point from a lower layer toward an upper layer. FIG. 3 is a diagram showing a flow of processing to be performed by the corresponding point determiner 107 for searching a corresponding point under the control of the search controller 105.

Referring to FIG. 3, the number of layers and the conversion magnification are the same as those in FIG. 2. For instance, a corresponding point T3 (p3, q3) in a reference image, which corresponds to a target point R3 (x3, y3) in a standard image of the third layer L3 is obtained by the corresponding point determiner 107.

Subsequently, in searching a corresponding point T2 (p2, q2) in a reference image, which corresponds to a target point R2 (x2, y2) in a standard image of the second layer L2, a search result of the third layer L3 is used. Specifically, the corresponding point T2 (p2, q2) of the second layer L2 is presumed to be present near the position obtained by substantially multiplying by two times the corresponding point T3 (p3, q3) of the third layer L3.

In view of the above, the corresponding point determiner 107 sets a search region in the second layer L2 on the basis of a position obtained by substantially multiplying by two times the corresponding point T3 (p3, q3), and mainly searches a region in the vicinity of the position. Performing the above operation makes it possible to efficiently search the corresponding point T2 (p2, q2).

After searching the corresponding point T2 (p2, q2), the corresponding point determiner 107 sets a search region in the first layer L1 on the basis of a position obtained by multiplying by two times the corresponding point T2 (p2, q2), and mainly searches a region in the vicinity of the position. Performing the above operation makes it possible to efficiently search the corresponding point T1 (p1, q1).

As described above, using a multi-resolution strategy of searching a corresponding point by setting a search region in an upper layer with use of a search result of a lower layer makes it possible to efficiently search a corresponding point. The multi-resolution strategy is also called as a coarse-to-fine strategy.

Referring back to FIG. 1, the initial position setter 106 sets an initial search position in a reference image of a target layer, based on a corresponding point searched in a layer immediately lower than the target layer. In this example, in the case where plural corresponding points are searched in a layer immediately lower than the target layer by the corresponding point determiner 107, the initial position setter 106 sets an initial search position with respect to each of the corresponding points in a reference image of the target layer.

Figure 4:
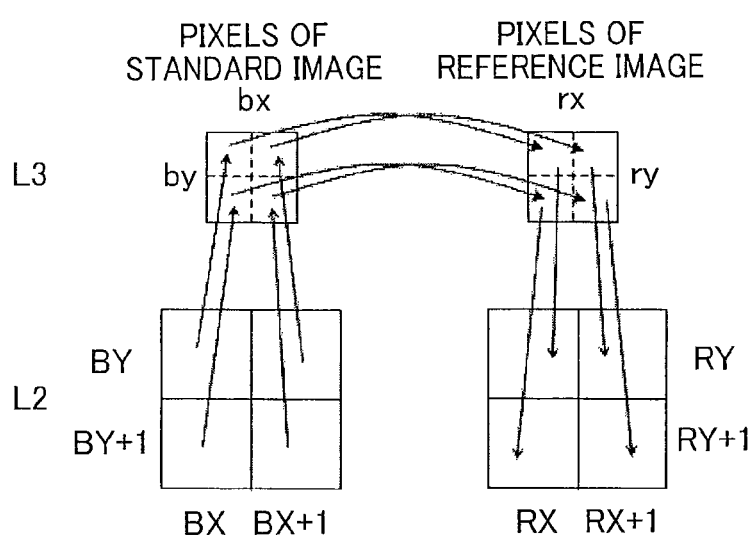
FIG. 4 is a diagram showing a part of a standard image and a part of a reference image in a layer L2 and in a layer L3.

FIG. 4 is a diagram showing a part of a standard image and a part of a reference image in the second layer L2 and in the third layer L3. In the following, a processing to be performed by the initial position setter 106 is described referring to FIG. 4. A target point (bx, by) in the third layer L3 is obtained as an average value of 2×2 pixels as represented by the points (BX, BY), (BX+1, BY), (BX, BY+1), and (BX+1, BY+1) in the second layer L2.

A point (rx, ry) in a reference image of the third layer L3 is a corresponding point of the target point (bx, by). The initial search position in a reference image of the second layer L2 is obtained by the following formula by using the corresponding point (rx, ry) in the third layer L3.

(RX,RY)=(2×rx,2×ry)

(RX+1,RY)=(2×rx+1,2×ry)

(RX,RY+1)=(2×rx,2×ry+1)

(RX+1,RY+1)=(2×rx+1,2×ry+1)

These four points (RX, RY), (RX+1, RY), (RX, RY+1), and (RX+1, RY+1) serve as the initial search position in the second layer L2. The above setting is advantageous in accurately setting the initial search position. In order to simplify the computation, it is possible to read (RX, RY)=(2×rx, 2×ry) as the initial search position, without obtaining the four points (RX, RY), (RX+1, RY), (RX, RY+1), and (RX+1, RY+1).

Referring back to FIG. 1, the corresponding point searching section 109 searches, in a reference image of a target layer, a corresponding point corresponding to a target point in a standard image of the target layer. The corresponding point searching section 109 is provided with the corresponding point determiner 107 and the corresponding point candidate determiner 108.

The target point determiner 107 sets a predetermined search region in a reference image of a target layer on the basis of an initial search position set in the target layer, and calculates a correlation value with respect to a target point at each of positions in the set search region.

Figures 5A, 5B:
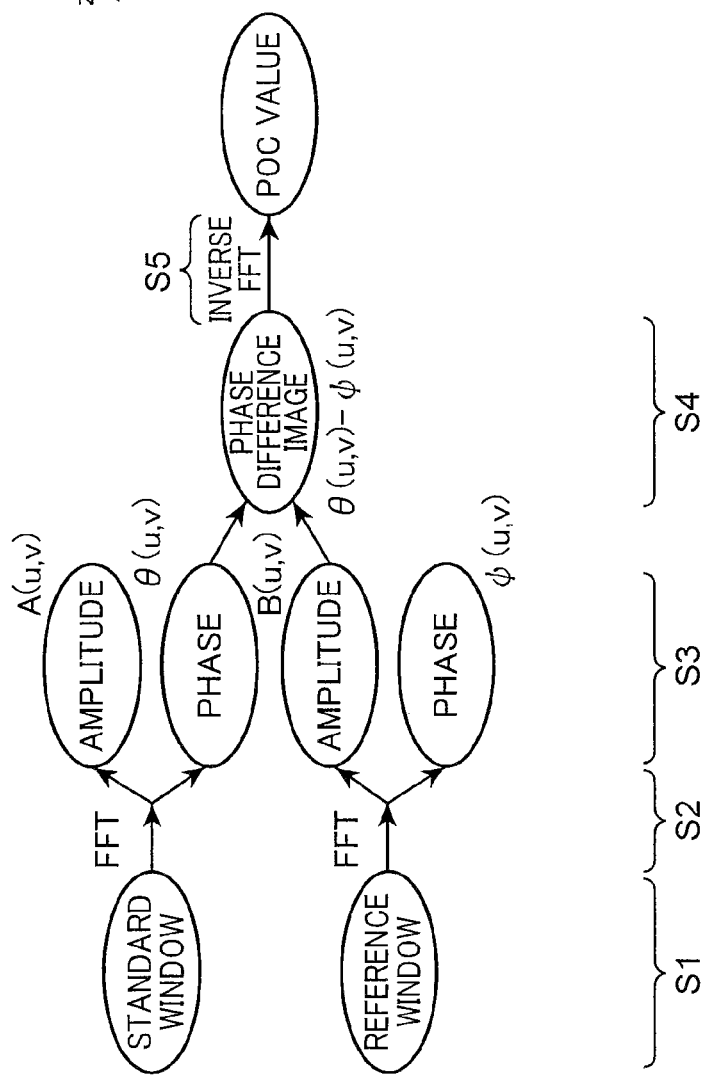
FIG. 5A is a diagram showing a flow of processing to be performed by a POC method.
FIG. 5B is a graph showing a distribution of POC values obtained by subjecting a phase difference image to an inverse Fourier transform.

In this example, the corresponding point determiner 107 calculates a correlation value at each of the positions in a search region, with use of a POC (phase-only correlation) method. FIG. 5A is a diagram showing a flow of processing to be performed by a POC method. Firstly, the corresponding point determiner 107 sets a standard window including a target point in a standard image as a center, and sets a reference window within a reference image (Step S1). The standard window and the reference window have the same window size as each other, and respectively have a rectangular shape.

Subsequently, the corresponding point determiner 107 performs a Fourier transform with respect to an image within the standard window and with respect to an image within the reference window (Step S2).

The Fourier transform is expressed by the following formula (1).

$$F(u,v) = \sum_{x,y} f(x,y) W_{N1}^{ux} W_{N2}^{vy} \quad (1)$$

$$W_N = e^{-j\frac{2\pi}{N}}$$

where
x, y denote a horizontal direction and a vertical direction of an input image,
u, v denote a frequency corresponding to x-direction, and a frequency corresponding to y-direction,
N1, N2 denote window sizes,
f(x, y) denote pixel values, and
F(u, v) denote frequency space values of f(x, y).

For instance, in the case where the size of the standard window and the reference window is 33×17, the frequency u is expressed by one direct-current component and sixteen alternate-current components, and the frequency v is expressed by one direct-current component and eight frequency components. Actually, the frequency u has thirty-two alternate-current components. However, since frequency data is such that alternate-current components are symmetrical to each other with respect to one direct-current component, the frequency u has sixteen alternate-current components.

In the case where the window size is a power of two, it is possible to use a FFT (fast Fourier transform) characterized by butterfly computation, as a Fourier transform. In view of the above, it is preferable to set the window size to a power of two in the aspect of high-speed processing. For instance, in the case where the window size is 32×16, the frequency u is expressed by one direct-current component and fifteen alternate-current components, and the frequency v is expressed by one direct-current component and seven alternate-current components.

Subsequently, the corresponding point determiner 107 separates a Fourier-transformed image within the standard window into a phase component θ(u, v) and an amplitude component A(u, v) with use of the formula (2), and separates a Fourier-transformed image within the reference window into a phase component φ(u, v) and an amplitude component B(u, v) with use of the formula (2) (Step S3).

$$A(u, v) \text{ or } B(u, v) = \sqrt{\text{Re}(u, v)^2 + \text{Im}(u, v)^2} \quad (2)$$

$$\theta(u, v) \text{ or } \phi(u, v) = \tan^{-1}\left(\frac{\text{Im}(u, v)}{\text{Re}(u, v)}\right)$$

where
Re(u, v) denotes a real part of a Fourier-transformed image, and
Im(u, v) denotes an imaginary part of a Fourier-transformed image.

Subsequently, the corresponding point determiner 107 obtains a phase difference image by obtaining a difference between the phase component θ(u, v) and the phase component φ(u, v) (Step S4).

Subsequently, the corresponding point determiner 107 performs an inverse Fourier transform with respect to the phase difference image (Step S5), and obtains a POC value, which is a correlation value. FIG. 5B is a graph showing a distribution of POC values obtained by subjecting a phase difference image to an inverse Fourier transform. As shown in FIG. 5B, subjecting a phase difference image to an inverse Fourier transform makes it possible to obtain a POC value at each position of an image within the standard window and of an image within the reference window.

Specifically, x-axis and y-axis respectively indicate x-component and y-component of a displacement amount of an image within the reference window relative to an image within the standard window, and z-axis indicates a POC value.

Assuming that an image within the reference window is displaced by (xs, ys) relative to an image within the standard window, a correlation peak appears at the position (xs, ys). In this way, the phase-only correlation method has a feature that a sharp correlation peak appears at a position representing a displacement amount, and is capable of accurately obtaining a displacement amount of an image within the reference window relative to an image within the standard window. A POC value at each position as represented by x-axis and y-axis corresponds to a correlation value at each position in a search region.

Assuming that a position where a correlation peak appears is (xs, ys), the corresponding point determiner 107 determines that a position obtained by displacing the center of the reference window by (xs, ys) as a corresponding point.

Referring back to FIG. 1, the corresponding point candidate determiner 108 determines whether plural correlation peaks appear, based on correlation values calculated by the corresponding point determiner 107. In the case where the corresponding point candidate determiner 108 determines that plural correlation peaks appear, the corresponding point determiner 107 calculates a ratio between correlation values as represented by the correlation peaks, determines one or more corresponding points based on the calculated ratio, and notifies a determination result to the initial position setter 106.

Figure 6:
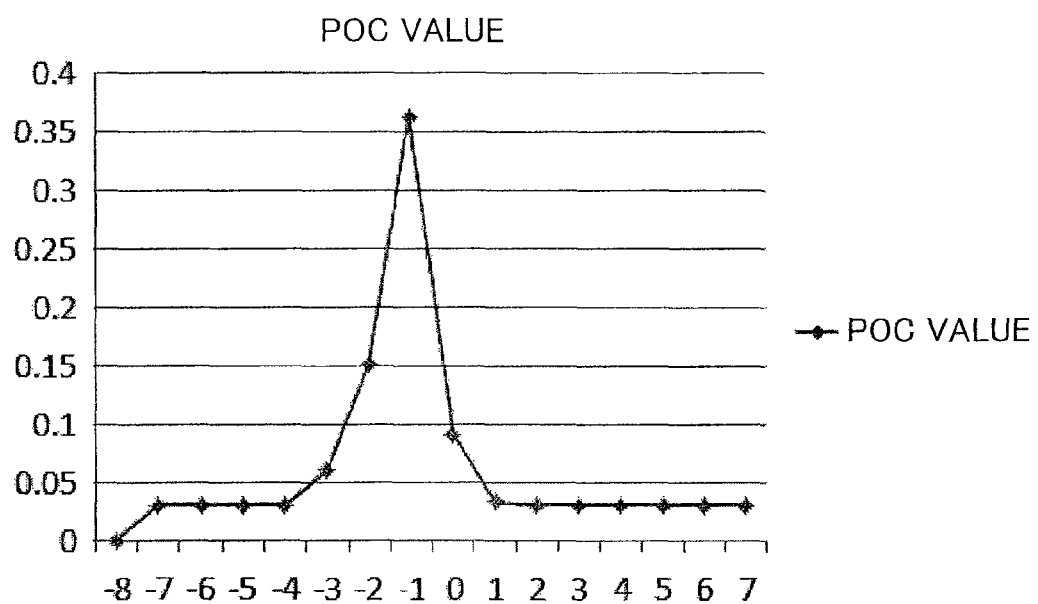
FIG. 6 is a graph showing an example of a distribution of POC values, wherein the axis of ordinate indicates a POC value, and the axis of abscissa indicates a position.

FIG. 6 is a graph showing an example of a distribution of POC values, wherein the axis of ordinate indicates a POC value and the axis of abscissa indicates a position. To simplify the description, FIG. 6 shows a distribution of POC values as a one-dimensional graph.

Conventionally, a position having a largest POC value is determined to be a corresponding point, and a degree of reliability of the corresponding point is obtained, based on the magnitude of the POC value at the position. It should be noted that a degree of reliability indicates an accuracy of a corresponding point, and relies on the design of algorithm. For instance, a value obtained by normalizing each of the POC values in such a manner that the sum of all the POC values becomes 1 is used as a degree of reliability. In the case where the degree of reliability is 0.2 or larger, for instance, a corresponding point having the degree of reliability is determined to have a high degree of reliability.

In the following, there is described a case to be solved by the corresponding point searching apparatus of the embodiment. FIGS. 7A to 7C are graphs for describing a problem involved in the conventional method, wherein FIG. 7A is a graph showing a distribution of POC values, in the case where two correlation peaks appear in a certain layer L(i), and FIGS. 7B and 7C are graphs showing a distribution of POC values in a layer L (i−1) immediately higher than the layer L(i).

According to the conventional method, in the case where two correlation peaks appear as shown in FIG. 7A, a corresponding point is determined with use of a position at which a correlation peak having a higher degree of reliability appears out of the two correlation peaks. However, it is not easy to specify which one of the two correlation peaks represents a true corresponding point. In particular, in the case where the degrees of reliability of two correlation peaks are close to each other, it is difficult to determine a true corresponding point.

In the case where a true corresponding point is selected in FIG. 7A, setting a search region based on the corresponding point and searching a corresponding point in the layer L(i−1) makes it possible to obtain a sharp correlation peak in a distribution of POC values as shown in FIG. 7B. Thus, it is possible to search a true corresponding point even in the layer L(i−1).

On the other hand, in the case where a true corresponding point is not selected in FIG. 7A, setting a search region based on the corresponding point and searching a corresponding point in the layer L(i−1) results in failure of obtaining a sharp correlation peak as shown in FIG. 7C. Thus, the possibility of searching a true corresponding point in the layer L(i−1) is lowered.

In view of the above, in the embodiment, in the case where two correlation peaks are detected in the layer L(i), and it is difficult to determine which one of the correlation peaks represents a true corresponding point because the correlation values of the correlation peaks are close to each other, two corresponding points are determined with use of the two correlation peaks, without determining a corresponding point with use of one of the correlation peaks. In this way, a corresponding point is determined in the layer L(i−1) by setting a search region with respect to each of the corresponding points in the layer L(i−1) for searching a corresponding point.

In this example, the size of a search region is the same in all the layers. Accordingly, the relative size of a search region with respect to a reference image decreases toward an upper layer. Consequently, the search region is narrowed toward an upper layer, and the possibility of including plural subjects having different subject distances in a search region is lowered. As a result, it is possible to increase the possibility of obtaining only one correlation peak in a final stage of processing. This is advantageous in implementing a corresponding point search with high precision.

Specifically, the corresponding point candidate determiner 108 extracts a position having a largest POC value in a search region, and determines that a first correlation peak appears at the extracted position. Then, in the case where a second largest POC value is larger than a predetermined threshold value α1, the corresponding point candidate determiner 108 determines that a second correlation peak appears at a position having the second largest POC value. In this case, it is determined that plural correlation peaks appear.

On the other hand, in the case where the second largest POC value is not larger than the threshold value α1, the corresponding point candidate determiner 108 determines only the first correlation peak as a correction peak. In this case, the corresponding point candidate determiner 108 determines that only one correlation peak appears. It is possible to use a correlation value that clearly shows that the correlation value does not represent a correlation peak, as the threshold value α1.

In the case where the corresponding point candidate determiner 108 determines that plural correlation peaks appear, the corresponding point determiner 107 calculates a ratio (P2/P1) of the correlation value P2 of the second correlation peak to the correlation value P1 of the first correlation peak.

In the case where the ratio is not larger than a predetermined value Vth1, the corresponding point determiner 107 determines a corresponding point with use of only the position of the first correlation peak. On the other hand, in the case where the ratio is larger than the value Vth1, the corresponding point determiner 107 determines two corresponding points with use of the position of the first correlation peak and the position of the second correlation peak, respectively.

Figures 8A, 8B:
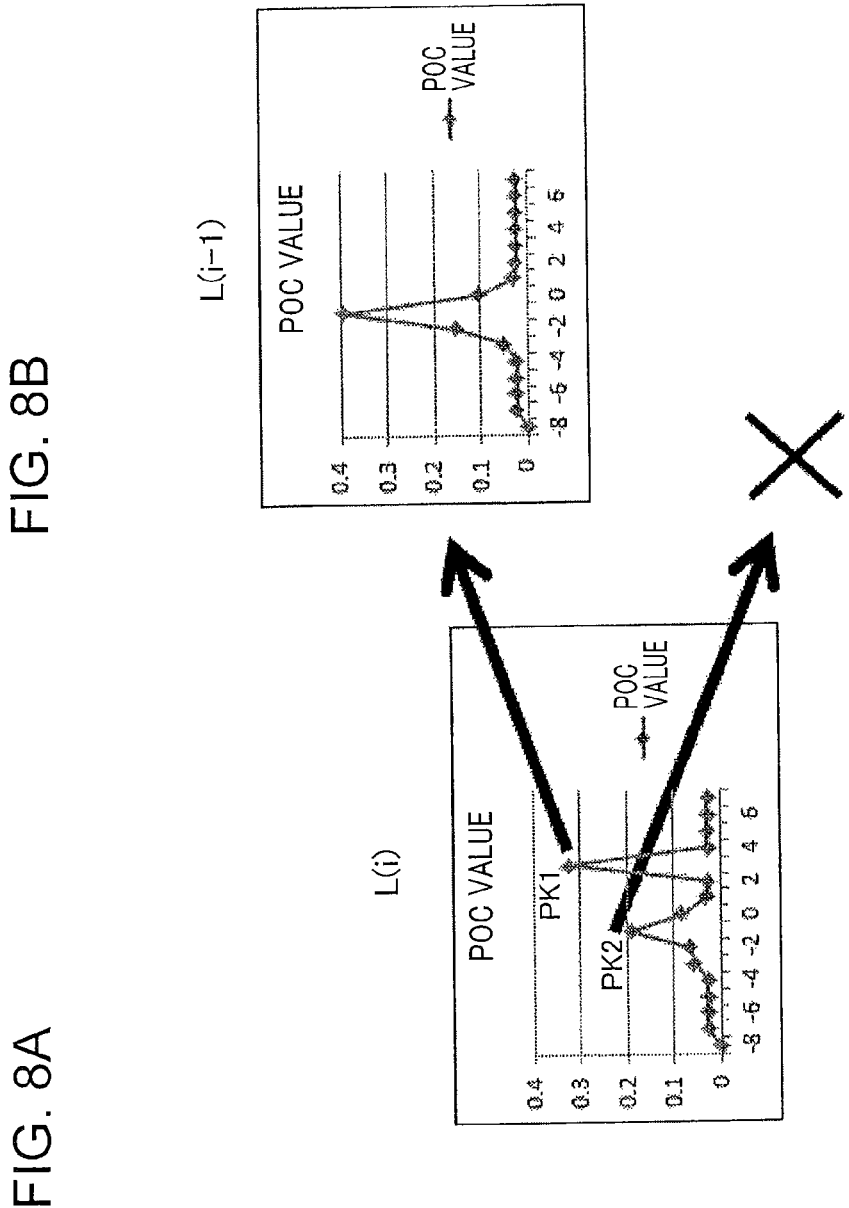
FIGS. 8A and 8B are graphs for describing a corresponding point search processing to be performed in the embodiment, wherein the axis of ordinate indicates a POC value, and the axis of abscissa indicates a position.

FIGS. 8A and 8B are graphs for describing a corresponding point search processing to be performed in the embodiment, wherein the axis of ordinate indicates a POC value, and the axis of abscissa indicates a position. Referring to FIG. 8A, two correlation peaks PK1 and PK2 appear, but the ratio of the correlation value P2 to the correlation value P1 is lower than the value Vth1. In this case, the corresponding point determiner 107 determines only the correlation peak PK1 as a correlation peak.

In other words, even if two correlation peaks appear, as far as the correlation value P2 of the correlation peak PK2 is smaller than the correlation value P1 of the correlation peak PK1, it is highly likely that the correlation peak PK1 represents a corresponding point. Accordingly, in the above case, a corresponding point is determined only with use of the correlation peak PK1. As a result of the above operation, as shown in FIG. 8B, it is possible to increase the possibility of obtaining a sharp correlation peak in the layer L(i−1).

In the embodiment, P2/P1 is used as the ratio. Alternatively, an inverse (P1/P2) of P2/P1 may be used as the ratio. In the above modification, in the case where the ratio is smaller than a predetermined value Vth2, the corresponding point candidate determiner 108 may determine that plural correlation peaks appear; and in the case where the ratio is not smaller than the value Vth2, the corresponding point candidate determiner 108 may determine that one correlation peak appears.

Further, in the case where a difference value (P1−P2) obtained by subtracting the correlation value P2 from the correlation value P1 is smaller than a predetermined value Vth3, the corresponding point candidate determiner 108 may determine that plural correlation peaks appear; and in the case where the difference value is not smaller than the value Vth3, the corresponding point candidate determiner 108 may determine that one correlation peak appears.

The predetermined values Vth1 to Vth3 may be a fixed value, or may be determined by using the following formula.

$$Vth1 \text{ to } Vth3 = \alpha \times P1 \text{ (where } \alpha \text{ is a fixed value)}$$

In the above modification, the values of Vth1 to Vth3 are determined according to the correlation value P1, as necessary.

Figure 9:
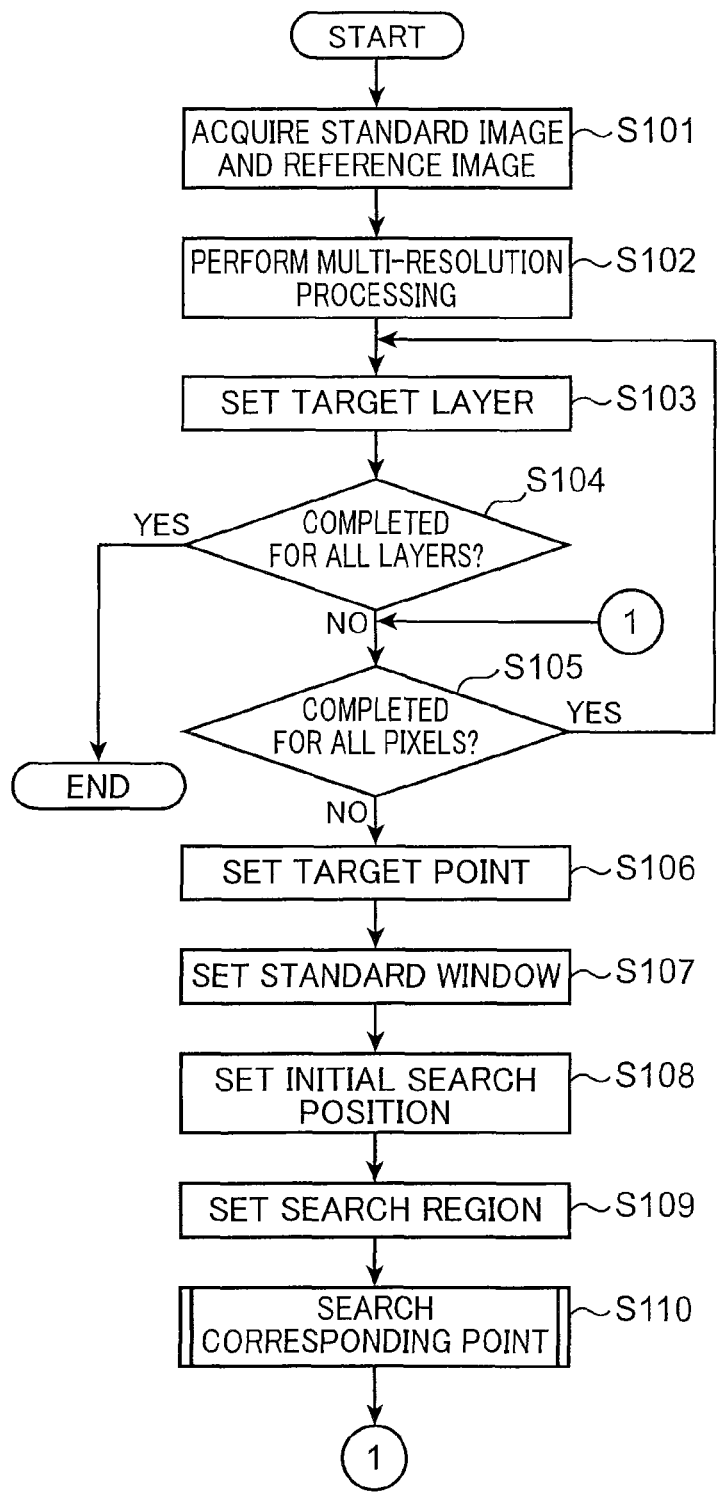
FIG. 9 is a flowchart showing an operation to be performed by the corresponding point searching apparatus of the embodiment.

FIG. 9 is a flowchart showing an operation to be performed by the corresponding point searching apparatus embodying the invention. The processing shown in FIG. 9 is executed, each time an input image is photographed by the cameras 101 and 102.

Firstly, the image acquirer 103 acquires an input image photographed by the camera 101 as a standard image, and an input image photographed by the camera 102 as a reference image (Step S101). Subsequently, the multi-resolution image generator 104 performs resolution reduction with respect to the standard image and the reference image, and generates plural standard images having resolutions different from each other and plural reference images having resolutions different from each other (Step S102). In this example, as shown in FIG. 2, standard images of four layers L1 to L4, and reference images of four layers L1 to L4 are generated.

Subsequently, the search controller 105 sets a target layer (Step S103). In the example shown in FIG. 2, the search controller 105 sequentially sets a target layer from the fourth layer L4 toward the first layer L1 in such a manner that the fourth layer L4 is designated as a target layer, followed by designation of the third layer L3 as a target layer.

Subsequently, the search controller 105 determines whether the search processing with respect to all the layers has been completed. In the case where the search processing with respect to all the layers has been completed (YES in Step S104), the processing is finished. On the other hand, in the case where the search processing with respect to all the layers has not been completed (NO in Step S104), the search controller 105 determines whether the search processing with respect to all the points which have been set as a target point in the standard image of the target layer has been completed (Step S105).

In the case where the search controller 105 determines that the search processing with respect to all the points has been completed (YES in Step S105), the processing is returned to Step S103, and the search controller 105 sets a layer immediately higher than the target layer as a new target layer.

On the other hand, in the case where the search controller 105 determines that the search processing with respect to all the points has not been completed (NO in Step S105), the corresponding point determiner 107 sets a target point in the standard image of the target layer (Step S106). In this case, a position obtained by multiplying the coordinate of a target point set in the layer immediately lower than the target layer by an inverse of the conversion magnification may be set as the target point in the target layer.

Subsequently, the corresponding point determiner 107 sets a standard window within the standard image of the target layer including the target point set in Step S106 as a center (Step S107).

Subsequently, the initial position setter 106 sets an initial search position in the reference image of the target layer, with use of the corresponding point searched in the layer immediately lower than the target layer by the method shown in FIG. 4 (Step S108).

In the case where two corresponding points are retrieved in the layer immediately lower than the target layer, the initial position setter 106 sets two initial search positions in the reference image of the target layer. Further, in the case where the lowermost layer is the target layer, there is no layer immediately lower than the target layer. In this case, the initial position setter 106 may set a predetermined position (e.g. the center position of the lowermost layer) as an initial search position.

Subsequently, the corresponding point determiner 107 sets a search region in the reference image of the target layer by using the initial search position set in Step S108 as a reference (Step S109). In this example, the search region is set in such a manner that the center of the search region coincides with the initial search position. The search region has a same size in all the layers.

Further, in the case where plural initial search positions are set in Step S108, the corresponding point determiner 107 sets plural search regions by using each of the initial search positions as a reference.

Subsequently, the corresponding point determiner 107 executes a corresponding point search processing (Step S110). In the case where plural search regions are set in Step S109, the corresponding point determiner 107 searches a corresponding point in all the search regions. After the processing of Step S110 is finished, the processing is returned to Step S105 to continue the processing.

Figure 10:
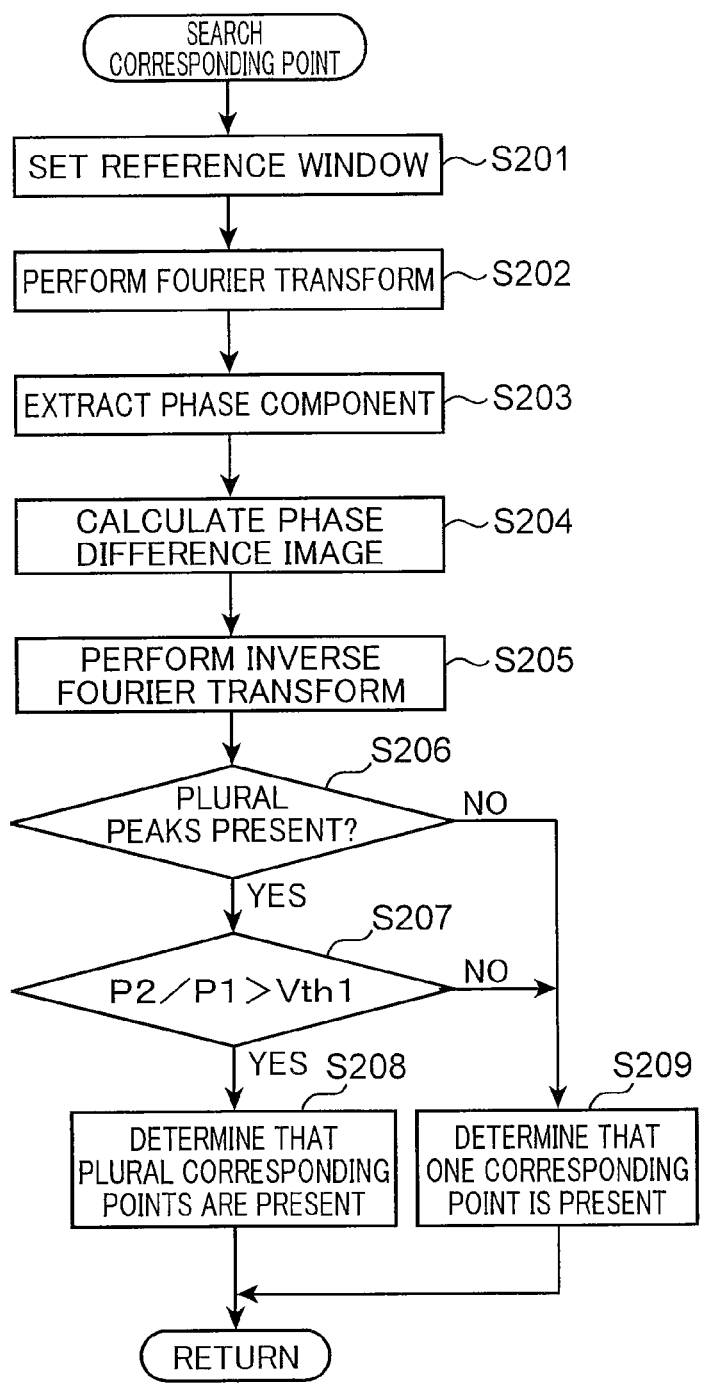
FIG. 10 is a flowchart showing the details of a processing of Step S110 in FIG. 9.

FIG. 10 is a flowchart showing the details of the processing of Step S110 in FIG. 9. Firstly, the corresponding point determiner 107 sets a reference window in the search region set in Step S109 (Step S201).

Subsequently, the corresponding point determiner 107 respectively performs a Fourier transform with respect to an image within the standard window and an image within the reference window (Step S202).

Subsequently, the corresponding point determiner 107 extracts a phase component $\theta(u, v)$ of the Fourier-transformed image within the standard window and a phase component $\phi(u, v)$ of the Fourier-transformed image within the reference window (Step S203).

Subsequently, the corresponding point determiner 107 calculates a phase difference image by subtracting the phase component $\phi(u, v)$ from the phase component $\theta(u, v)$ ($\theta(u, v)-\phi(u, v)$) (Step S204).

Subsequently, the corresponding point determiner 107 calculates a distribution of POC values by performing an inverse Fourier transform with respect to the phase difference image (Step S205). By performing the above operation, POC values at the respective positions in the search region are obtained.

Subsequently, the corresponding point candidate determiner 108 determines whether plural correlation peaks appear (Step S206). In the case where it is determined that first and second correlation peaks appear (YES in Step S206), the corresponding point determiner 107 determines whether the ratio (P2/P1) of the correlation value P2 to the correlation value P1 is larger than the value Vth1 (Step S207).

In the case where the ratio (P2/P1) is larger than the value Vth1 (YES in Step S207), the corresponding point determiner 107 determines two corresponding points with use of the positions of the first and second correlation peaks (Step S208). Specifically, the corresponding point determiner 107 obtains a displacement amount of an image within the reference window relative to an image within the standard window, from the position of the first correlation peak; and determines the position obtained by displacing the center of the reference window by the displacement amount, as a corresponding point. Further, the corresponding point determiner 107 determines a corresponding point representing the second correlation peak in the same manner as the processing of the first correlation peak.

On the other hand, in the case where it is determined that the first and second correlation peaks do not appear (NO in Step S206), the corresponding point determiner 107 proceeds the processing to Step S209. Further, in the case where the ratio (P2/P1) is not larger than the value Vth1 (NO in Step S207), the corresponding point determiner 107 proceeds the processing to Step S209.

Subsequently, the corresponding point determiner 107 determines one corresponding point with use of the position of the first correlation peak (Step S209).

<First Modification>

In the embodiment, it is determined whether plural correlation peaks appear from the magnitude of a POC value. In the first modification, it is determined whether plural correlation peaks appear with use of another judgment parameter, in addition to the magnitude of a POC value.

The details are as follows.

i) In the case where a correlation value is at the apex of a peak, the correlation value is determined to be a correlation peak. In this case, the corresponding point candidate determiner 108 specifies a largest correlation value P1. Then, it is determined whether the correlation value P1 is at the apex of a peak. In the case where the correlation value P1 is at the apex of a peak, the correlation value P1 is determined to be a first correlation peak. In this example, a determination as to whether the correlation value is at the apex of a peak may be performed by differentiating the correlation value. On the other hand, in the case where the correlation value P1 is not at the apex of a peak, it is determined whether a second largest correlation value P1' is at the apex of a peak. If it is determined that the correlation value P1' is at the apex of a peak, the correlation value P1' may be determined to be a first correlation peak.

In the case where the first correlation peak is specified, the corresponding point candidate determiner 108 specifies a correlation value P2 larger than a threshold value $\alpha 1$. In the case where the correlation value P2 is at the apex of a peak, the correlation value P2 is determined to be a second correlation peak. On the other hand, in the case where the correlation value P2 is not at the apex of a peak, a third largest correlation value P2', which is larger than the threshold value $\alpha 1$, is specified, and a determination as to whether the correlation value P2' is a second correlation peak is performed in the same manner as the processing of the correlation value P2.

ii) In the case where the ratio of the correlation value at a position adjacent to a target position to the correlation value at the target position within the search region is smaller than a predetermined value, it is determined that a correlation peak appears at the target position.

In the above case, the corresponding point candidate determiner 108 specifies a largest correlation value P1. Then, a correlation value P1_1 at a position adjacent to the correlation value P1 is specified. In the case where P1_1/P1 is not larger than a predetermined threshold value $\alpha 2$, the correlation value P1 is determined to be a first correlation peak. Four vicinity positions or eight vicinity positions may be used as positions adjacent to the target position. For instance, in the case where four vicinity positions are used, assuming that the correlation values at the four vicinity positions are respectively P1_1, P1_2, P13, and P1_4, the correlation value P1 may be determined to be a first correlation peak, in the case where at least one, or two, or three, or all of the values P1_1/P1, P1_2/P1, P1_3/P1, and P1_4/P1 is not larger than the threshold value $\alpha 2$.

In the case where the correlation value P1 is not determined to be a first correlation peak, a next largest correlation value P1' is specified, and a determination as to whether the correlation value P1' is a first correlation peak may be performed in the same manner as the processing of the correlation value P1.

In the case where the correlation value P1' is determined to be a first correlation peak, the corresponding point candidate determiner 108 specifies a next largest correlation value P2, which is larger than the threshold value α1, and detects a second correlation peak with use of the same method as used in determining the first correlation peak.

iii) In the case where a difference value obtained by subtracting the correlation value at a position adjacent to a target position from the correlation value at the target position within a search region is larger than a predetermined value, it is determined that a correlation peak appears at the target position.

In the above case, the corresponding point candidate determiner 108 specifies a largest correlation value P1. Then, the corresponding point candidate determiner 108 specifies a correlation value P1_1 at a position adjacent to the correlation value P1. Then, a difference value ΔP1 is obtained by performing the subtraction: P1–P1_1. In the case where the difference value ΔP1 is larger than a predetermined threshold value α3, the correlation value P1 is determined to be a first correlation peak. Four vicinity positions or eight vicinity positions may be used as positions adjacent to the target position. For instance, in the case where four vicinity positions are used, assuming that the correlation values at the four vicinity positions are respectively P1_1, P1_2, P13, and P1_4, difference values ΔP1, ΔP2, ΔP3, and ΔP4 between the correlation value P1; and the correlation values P1_1, P1_2, P1_3, and P1_4 are obtained, and in the case where one, or two, or three, or all of the difference values is larger than the threshold value α3, the correlation value P1 may be determined to be a first correlation peak.

In the case where the correlation value P1 is not determined to be a first correlation peak, a next largest correlation value P1' is specified, and a determination as to whether the correlation value P1' is a first correlation peak may be performed in the same manner as the processing of the correlation value P1.

Then, in the case where the correlation value P1' is determined to be a first correlation peak, the corresponding point candidate determiner 108 specifies a next largest correlation value P2, which is larger than the threshold value α1, and detects a second correlation peak with use of the same method as used in determining the first correlation peak.

Using one of the methods i) to iii) described in the first modification is advantageous in accurately detecting a correlation peak.

<Second Modification>

Figure 11:
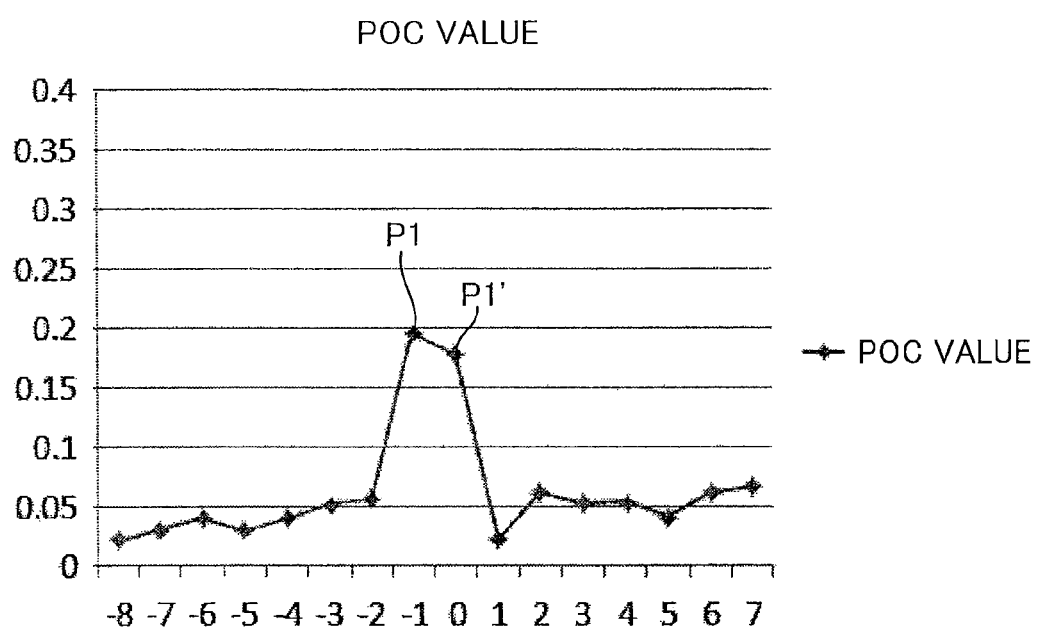
FIG. 11 is a graph showing a distribution of POC values in the case where large correlation values are adjacent to each other, wherein the axis of ordinate indicates a POC value, and the axis of abscissa indicates a position.

In the embodiment, the largest correlation value P1 is determined to be a first correlation peak, and the second largest correlation value P2, which is smaller than the correlation value P1 but is larger than the threshold value α1, is determined to be a second correlation peak. FIG. 11 is a graph showing a distribution of POC values in the case where large correlation values are adjacent to each other, wherein the axis of ordinate indicates a POC value, and the axis of abscissa indicates a position.

As shown in FIG. 11, a correlation value P1' adjacent to a correlation value P1 has a large value, but is not present at the apex of a peak. Accordingly, it is not preferable to detect the correlation value P1' as a correlation peak.

In view of the above, in the second modification, it is not determined that a correlation peak appears at the adjacent position. Specifically, the corresponding point candidate determiner 108 determines the largest correlation value P1 as a first correlation peak. Then, the corresponding point candidate determiner 108 detects a second largest correlation value P2, which is smaller than the correlation value P1 but is larger than the threshold value a 1. In the case where the correlation value P2 is adjacent to the correlation value P1, the correlation value P2 is not detected to be a second correlation peak.

On the other hand, in the case where the correlation value P2 is not adjacent to the correlation value P1, the correlation value P2 is detected to be a second correlation peak. In this example, in the case where the correlation value P2 is away from the correlation value P1 by e.g. two pixels or more, more specifically, in the case where the correlation value P2 is present at a position away from the correlation value P1 by a distance corresponding to one pixel, the corresponding point candidate determiner 108 may detect the correlation value P2 as a second correlation peak.

<Third Modification>

In the embodiment, in the case where plural search regions are set, a first correlation peak and a second correlation peak are detected in all the search regions, and two corresponding points at most are determined from a target layer.

In the third modification, in the case where plural search regions are set, a first correlation peak and a second correlation peak are detected in each of the search regions, and all the corresponding points are transferred to a layer immediately higher than the target layer, even in the case where three or more corresponding points are retrieved.

Figure 12:
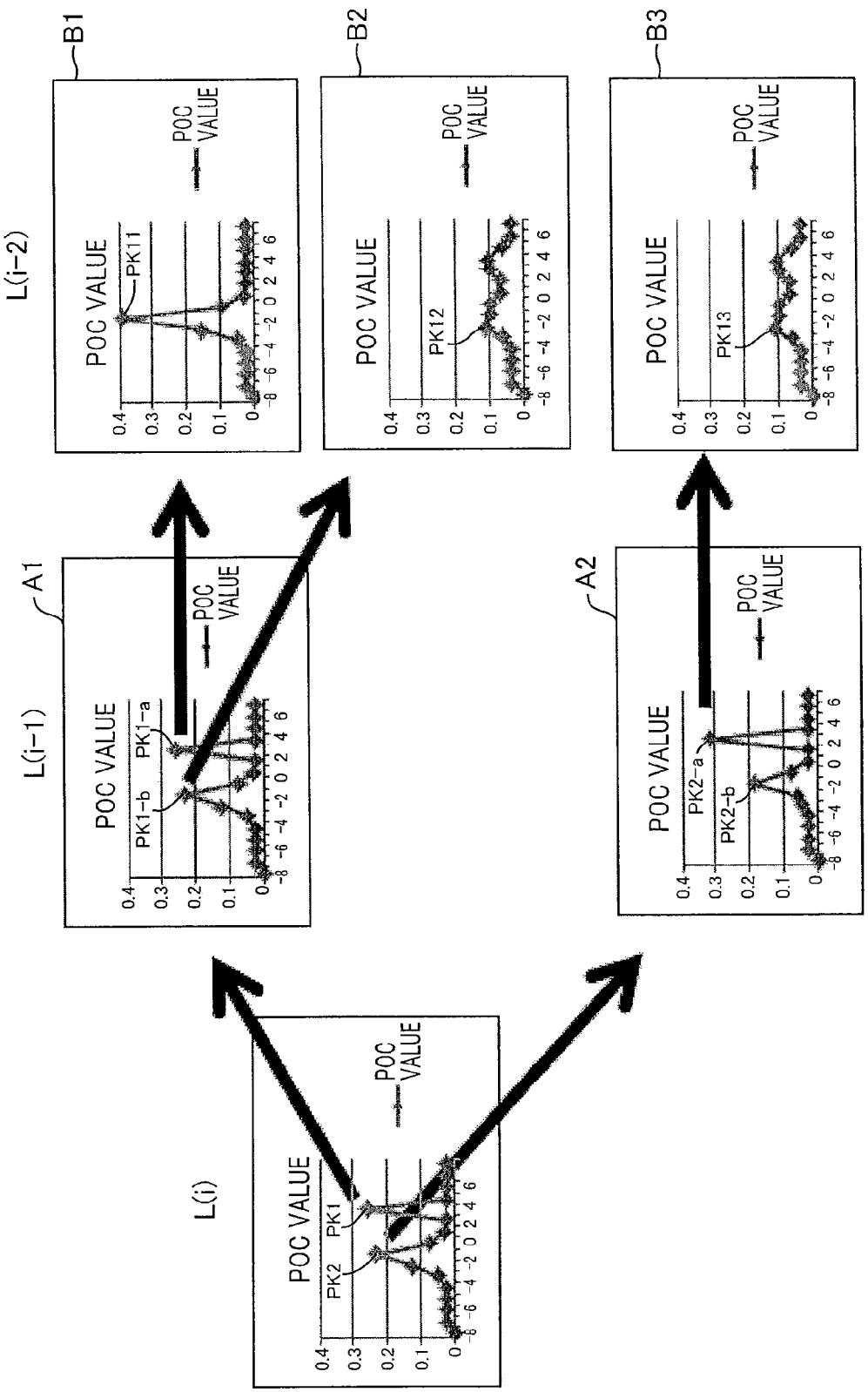
FIG. 12 is a diagram showing a manner as to how plural corresponding points are transferred to upper layers.

FIG. 12 is a diagram showing a manner as to how plural corresponding points are transferred to upper layers. In the layer L(i), correlation peaks PK1 and PK2 are detected as a first correlation peak and a second correlation peak.

In the layer L(i–1), a search region A1 is set based on the correlation peak PK1, and a search region A2 is set based on the correlation value PK2. In this case, the corresponding point candidate determiner 108 determines whether a first correlation peak and a second correlation peak appear in each of the search regions A1 and A2.

As a result of the above operation, in the layer L(i–1), two correlation peaks PK1_a and PK1_b are detected in the search region A1. Further, two correlation peaks PK2_a and PK2_b are detected in the search region A2.

The corresponding point determiner 107 determines two corresponding points based on the correlation peaks PK1_a and PK2_b in the search region A1. Accordingly, in the layer L(i–2), a search region B1 based on the correlation peak PK1_a, and a search region B2 based on the correlation peak PK1_b are set.

On the other hand, the corresponding point determiner 107 determines one corresponding point solely based on the correlation peak PK2_a, out of the two correlation peaks in the search region A2. Accordingly, in the layer L(i–2), a search region B3 based on the correlation peak PK2_a is set.

The corresponding point candidate determiner 108 detects a first peak and a second peak in each of the search regions B1 to B3. In the example shown in FIG. 12, whereas a sharp correlation peak appears in the search region B1, a sharp correlation peak does not appear in the search regions B2 and B3.

As described above, in the case where plural search regions are set, it is determined whether plural correlation peaks appear in each of the search regions. In the case where plural correlation peaks appear, and plural corresponding points are detected, a search region with respect to each of the corresponding points is set in an upper layer.

The above configuration makes it possible to avoid a case that a corresponding point serving as a solution is excluded from the candidates. Accordingly, as shown by the layer L(i−2) in FIG. 12, it is possible to increase the possibility of obtaining one sharp correlation peak at a final stage of processing. This is advantageous in enhancing the search precision of a corresponding point. The third modification may be combined with the first modification or the second modification.

<Fourth Modification>

In the third modification, two corresponding points are detected in each of the search regions. Accordingly, the number of corresponding points may increase stage by stage toward an upper layer. In such a case, an extremely large number of corresponding points may be detected in an upper layer, and it may be difficult to select a true corresponding point as a final solution. Thus, the above case may result in lowering the detection precision.

In view of the above, in the fourth modification, the number of corresponding points to be transferred to an upper layer is restricted. Specifically, the maximum number of corresponding points to be transferred to an upper layer is determined with respect to each of the layers. The relative size of a reference window with respect to a reference image is large in a lower layer. Accordingly, a variety of subject distances may be present in an image within the reference window. In view of the above, the maximum number of corresponding points is set such that the maximum number increases toward a lower layer, and the maximum number decreases toward an upper layer. In the case where corresponding point candidates (candidate points) of a number exceeding the maximum number are detected in a target layer, the corresponding point determiner 107 may select candidate points of the maximum number from the candidate points having large correlation values, and may transfer the selected candidate points to an upper layer as corresponding points.

The above configuration makes it possible to prevent a case that an extremely large number of corresponding points are detected in an upper layer and it may be difficult to select a true corresponding point as a final solution.

<Fifth Modification>

In the fifth modification, in the case where plural corresponding points are detected in an uppermost layer, one corresponding point serving as a solution is determined Specifically, one of the following methods is used.

i) A corresponding point having a largest correlation value is determined as a solution, out of the plural corresponding points detected in an uppermost layer.

ii) A corresponding point having a highest degree of similarity to a peripheral pixel is determined as a solution, out of the plural corresponding points detected in an uppermost layer. In this example, a degree of similarity means closeness to a peripheral pixel in terms of parallax. For instance, let us assume that the parallax of a certain corresponding point T1 is d1, and the parallax of a pixel T1_1 in the vicinity of the corresponding point T1 is d2. In this case, an inverse (=1/Δd12) of a difference Δd12 between the parallax d1 and the parallax d2 serves as a degree of similarity SIM1 of the corresponding point T1. Likewise, let us assume that a degree of similarity of another corresponding point T2 is SIM2, and SIM1>SIM2. In this case, the corresponding point T1 serves as a solution.

iii) A corresponding point having a highest degree of stability is determined as a solution, out of the plural corresponding points detected in an uppermost layer. A degree of stability is defined such that a corresponding point having a feature that plural correlation peaks are sequentially detected from a lower layer is determined to have a low degree of stability, and a corresponding point having a feature that plural correlation peaks are less likely to appear is determined to have a high degree of stability.

A degree of stability is described referring to FIG. 12. Let us assume that corresponding points T1, T2, and T3 are detected based on correlation peaks PK11, PK12, and PK13, while setting the layer L(i−2) as an uppermost layer.

The correlation peak of the corresponding point T1 is shifted in the order of PK1→PK1_a→PK11. PK1 is split into two portions in the layer L(i), and PK1_a is split into two portions in the layer L(i−1). Accordingly, the degree of stability of the corresponding point T1 is $(½)^2$. In this example, the expression "split into two portions" means that two corresponding points are detected. Accordingly, in the case where three corresponding points are detected, a peak is split into three portions.

The correlation peak of the corresponding point T2 is shifted in the order of PK1→PK1_b→PK12. PK1 is split into two portions in the layer L(i), and PK1_b is split into two portions in the layer L(i−1). Accordingly, the degree of stability of the corresponding point T2 is $(½)^2$.

The correlation peak of the corresponding point T3 is shifted in the order of PK2→PK2_a→PK13. PK2 is split into two portions in the layer L(i), and PK2_a is not split into two portions in the layer L(i−1). Accordingly, the degree of stability of the corresponding point T3 is ½. In this case, the degree of stability of the corresponding point T3 is highest. Accordingly, the corresponding point T3 is determined to be a solution.

The processing of the fifth modification is applied to the uppermost layer. Alternatively, the processing of the fifth modification may be applied to a layer somewhere between the lowermost layer and the uppermost layer. The above modification makes it possible to eliminate generation of an unnecessary corresponding point. This is advantageous in preventing an increase in the computation time.

Further, a corresponding point serving as a solution may be determined by combining the processings of i) to iii) described in the fifth modification. In the foregoing example, one corresponding point is determined by using the method iii). However, in the case where plural corresponding points whose degrees of stability are the same as each other are present, and it is impossible to determine one corresponding point, one corresponding point may be determined by using the method i) or the method ii).

<Sixth Modification>

In the embodiment, to simplify the description, two correlation peaks i.e. a first correlation peak and a second correlation peak are detected. Alternatively, three correlation peaks may be detected.

For instance, in the case where three correlation values larger than the threshold value α1 are present in a search region, correlation values P1, P2, and P3 may be detected as correlation peaks, where P1>P2>P3. In this case, the corresponding point candidate determiner 108 obtains P2/P1 and P3/P1. In the case where P2/P1 and P3/P1 are larger than the value Vth1, the corresponding point candidate determiner 108 may obtain three corresponding points, based on three correlation peaks i.e. the correlation values P1, P2, and P3.

On the other hand, in the case where only P2/P1 is larger than the value Vth1, the corresponding point candidate determiner 108 may detect two corresponding points, based on two correlation peaks i.e. the correlation values P1 and P2.

<Seventh Modification>

In the embodiment, correlation values are calculated with use of a POC method. A method other than the POC method may be used. Examples of the other method include a DCT sign-only correlation method, and an SAD (Sum of Absolute Difference) method. The details of the DCT sign-only correlation method are disclosed in "Combination of image signal processing and image pattern recognition—DCT sign-only correlation and its application by Hitoshi KIYA, Tokyo Metropolitan University, Faculty of System Design, Workshop on Dynamic Image Processing for Real Application, 2007 (2007, 3. 8-9)".

Figure 13:
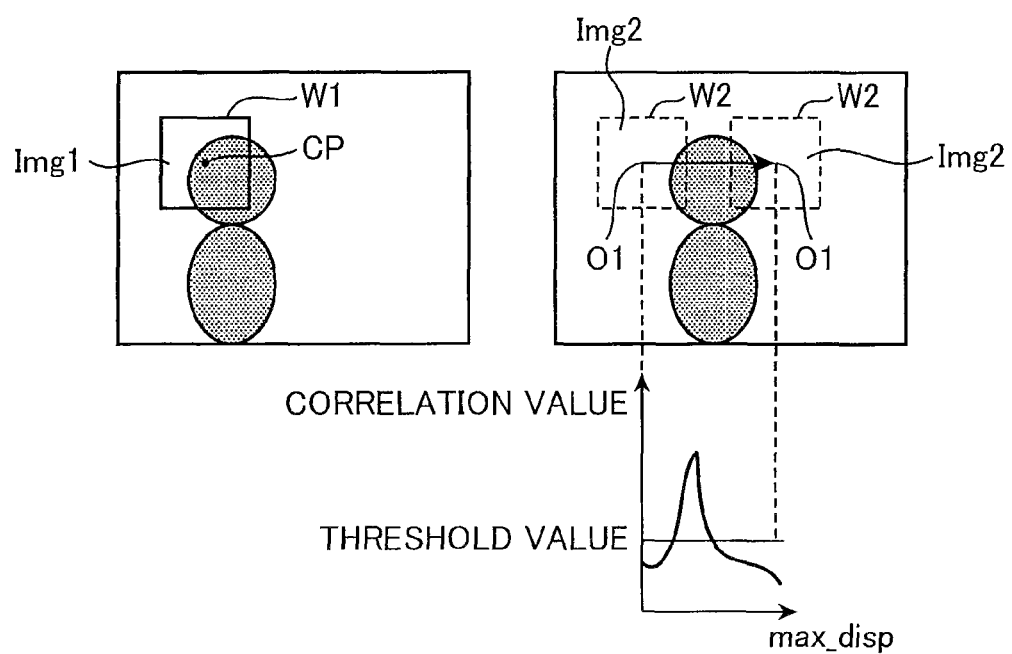
FIG. 13 is an explanatory diagram of an SAD method.

FIG. 13 is an explanatory diagram of an SAD method. As shown in FIG. 13, a target point CP is set in a standard image, and a standard window W1 including the target point CP as a center is set. In this example, the target point CP is sequentially set in such a manner that all the pixels or pixels interpolated by a certain interval within the standard image are raster scanned, for instance.

Subsequently, a certain pixel within a search region set in a reference image is set at a center point O1 of a reference window W2, and the reference window W2 including the center point O1 as a center is set. In this example, it is possible to use, as the search region, a region in the reference image having a feature such that the region has the same height as the target point CP in a vertical direction thereof and has a linear shape in parallel to a horizontal direction thereof. Subsequently, a correlation value $COR_p$ between an image Img1 within the standard window W1 and an image Img2 within the reference window W2 is calculated with use of the following formula (3).

$$COR_p = \frac{1}{SAD_p + 1} \quad (3)$$

$$SAD_P = \sum_{j=1}^{W} \sum_{i=1}^{W} |\text{img1}(i, j) - \text{Img2}(i, j + p)|$$

where
W denotes a window size of the standard window W1, and a window size of the reference window,
i denotes a coordinate in a vertical direction, j denotes a coordinate in a horizontal direction, and
p denotes a variable that satisfies a formula: $0 \leq p \leq \text{max\_disp}$, max_disp being a final search point.

After the correlation value $COR_p$ is obtained, the reference window W2 is shifted in the horizontal direction by incrementing p by one, and a next correlation value $COR_p$ is obtained.

Subsequently, the correlation value $COR_p$ is used as a correlation value at the center point O1 of an image within the reference window W2, a position having a largest correlation value is searched within the reference image, and the searched position is specified as a corresponding point of the target point CP set in the standard image. As shown in the graph of FIG. 13, the correlation value $COR_p$ has a high correlation with the image Img1 and the image Img2; and the correlation increases, as the degree of similarity increases.

It is possible to use an SSD (Sum of Squared Difference) method or an NCC (Normalized Cross Correlation) method, other than the SAD method.

First Use Example

Figure 14:
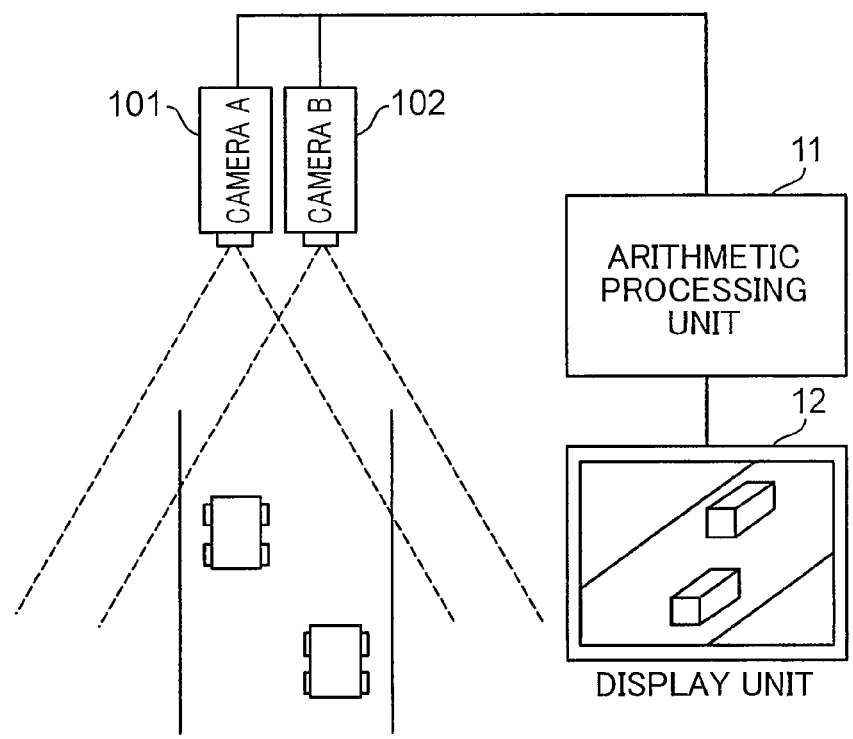
FIG. 14 is a block diagram showing a stereoscopic distance measurement system.

In the first use example, the corresponding point searching apparatus of the embodiment is applied to a stereoscopic distance measurement system. FIG. 14 is a block diagram showing a stereoscopic distance measurement system. The stereoscopic distance measurement system is loaded in a vehicle body of a vehicle such as an automotive vehicle, and is provided with cameras 101 and 102, an arithmetic processing unit 11, and a display unit 12.

The arithmetic processing unit 11 is provided with the corresponding point searching apparatus 110 shown in FIG. 1. The arithmetic processing unit 11 calculates a distance to an object in a forward direction of the vehicle body by a stereoscopic method with use of corresponding points detected by the corresponding point determiner 107. The display unit 12 is constituted of a display device such as a liquid crystal display or an organic EL display, and displays information generated by the arithmetic processing unit 11.

Figure 15:
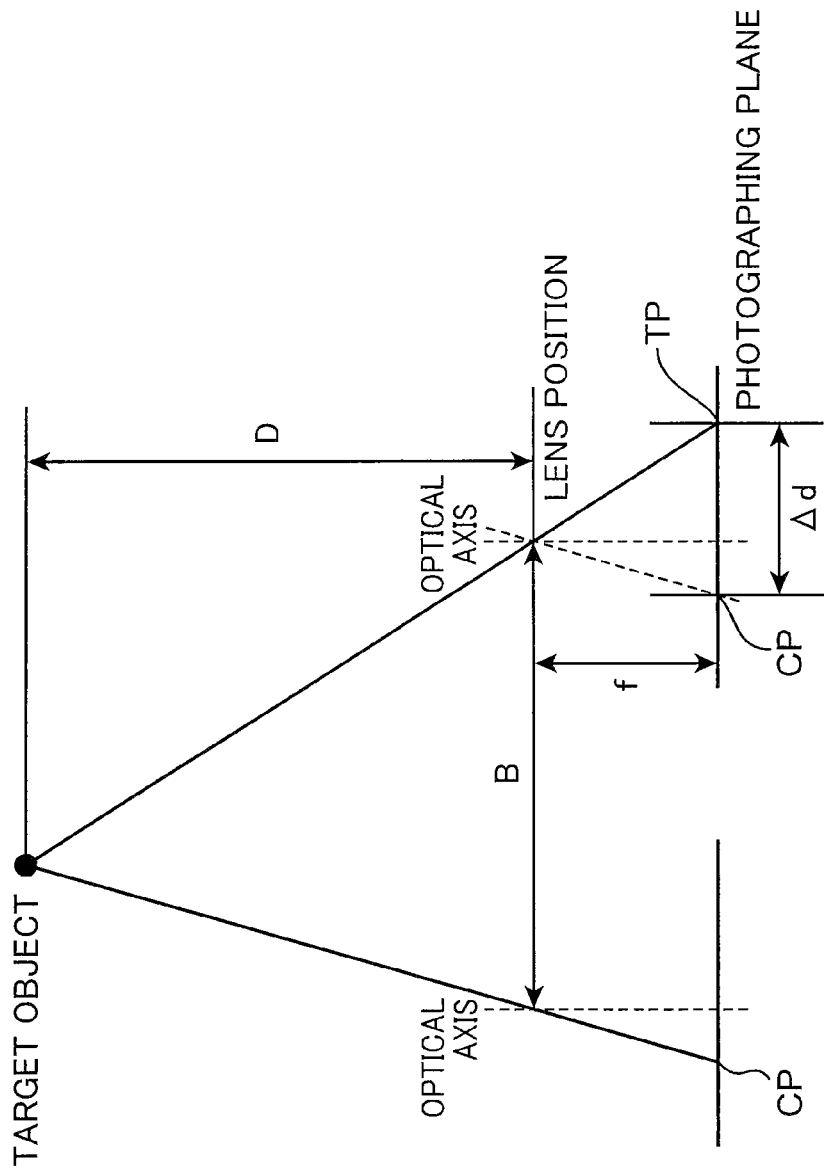
FIG. 15 is an explanatory diagram of a distance measuring method by a stereoscopic method.

FIG. 15 is an explanatory diagram of a distance measuring method by a stereoscopic method. Referring to FIG. 15, f denotes a focal length of a lens in the cameras 101 and 102. The number of pixels of a photographing plane (CCD) of the camera 101 is the same as the number of pixels of a photographing plane (CCD) of the camera 102. Further, the cameras 101 and 102 are disposed to be away from each other in left and right directions by a predetermined baseline length B in such a manner that the optical axes thereof are in parallel to each other. In this configuration, assuming that a parallax on the photographing plane to be obtained from the coordinate of the target point CP and the coordinate of the corresponding point TP is Δd, the distance D from the lens position to a target object is expressed by the following formula.

$$D = fB/\Delta d$$

Further, a three-dimensional position (X, Y, Z) of the target object is expressed by the following formula.

$$X = x \cdot D/f$$

$$Y = y \cdot Z/f$$

$$Z = D$$

where x and y denote coordinates of the target point CP.

In the case where the distance between the target object and the vehicle body is shorter than a predetermined value from the three-dimensional position of the target object, the arithmetic processing unit 11 determines that the target object is an obstacle, generates information that the obstacle is approaching the vehicle body, and displays the information on the display unit 12. Thus, the user is alerted of approaching of the obstacle.

Second Use Example

Figure 16:
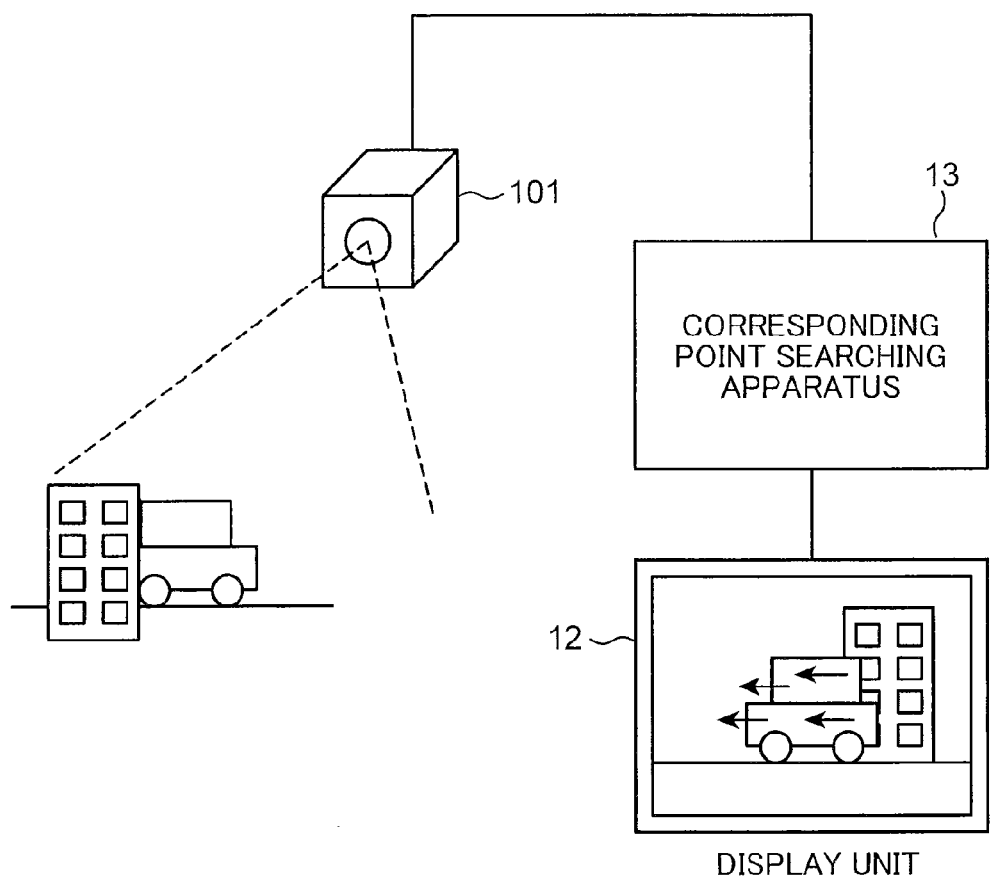
FIG. 16 is a block diagram of a system for correlating between input images consecutive to each other in a time-series manner.

In the second use example, the corresponding point searching apparatus of the embodiment is applied to a system for performing a corresponding point search with respect to input images consecutive to each other in a time-series manner. FIG. 16 is a block diagram of a system for correlating between input images consecutive to each other in a time-series manner.

The system is provided with a camera 101, a corresponding point searching apparatus 13, and a display unit 12. The camera 101 captures an image of a subject at a predetermined frame rate. The corresponding point searching apparatus 13 has substantially the same configuration as the corresponding point searching apparatus 110 shown in FIG. 1 except that a method for specifying a standard image and a reference image is different. In FIG. 1, an image captured by the camera 101 at a point of time t is used as a standard image, and an image captured by the camera 102 at the point of time t is used as a reference image. In the second use example, an image captured by the camera 101 at a point of time t is used as a standard image, and an image captured by the camera 102 at a point of time (t−1) is used as a reference image.

Subsequently, the corresponding point searching apparatus 13 detects a corresponding point corresponding to a target point within the standard image from the reference image. Subsequently, the corresponding point searching apparatus 13 calculates an optical flow of a target object by obtaining a difference between the corresponding point and the target point.

(Summary of the Corresponding Point Searching Apparatus)

(1) The corresponding point searching apparatus is provided with an image acquirer which acquires one of at least two input images as a standard image, and a rest of the input images as a reference image; a multi-resolution image generator which hierarchically generates a plurality of standard images having resolutions different from each other and a plurality of reference images having resolutions different from each other respectively from the standard image and the reference image acquired by the image acquirer; a corresponding point searching section which searches a corresponding point corresponding to a target point in a standard image of a target layer from a reference image of the target layer; an initial position setter which sets an initial search position in the reference image of the target layer, based on a corresponding point searched in a layer immediately lower than the target layer; and a search controller which causes the corresponding point searching section to sequentially search a corresponding point from a lower layer toward an upper layer. The corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear. In the case where the corresponding point searching section retrieves plural corresponding points, the initial position setter sets the initial search position with respect to each of the corresponding points.

According to the above configuration, in the case where plural correlation peaks are detected in a target layer, and it is difficult to determine which one of the correlation peaks is a solution, because the correlation values of the correlation peaks are close to each other, plural corresponding points are detected with use of each of the correlation peaks, without determining one corresponding point with use of one of the correlation peaks. Then, a corresponding point is determined in an upper layer in such a manner that a search region is set with respect to each of the corresponding points in a layer immediately higher than the target layer for searching a corresponding point.

In this example, in the case where the size of a search region is the same in all the layers, the relative size of a search region with respect to the reference image decreases toward an upper layer. Accordingly, the search region is narrowed toward an upper layer, and the possibility of including plural subjects having different subject distances in the search region is lowered. As a result, it is possible to increase the possibility of obtaining only one correlation peak in a final stage of processing. This is advantageous in implementing a corresponding point search with high precision.

(2) Preferably, in the case where it is determined that plural correlation peaks appear, the corresponding point searching section may calculate a ratio of a correlation value of a second correlation peak other than a first correlation peak to a correlation value of the first correlation peak at which the correlation value is largest; in the case where the second correlation peak having the ratio larger than a predetermined value is not present, the corresponding point searching section may determine a corresponding point only from the first correlation peak; and in the case where the second correlation peak having the ratio larger than the predetermined value is present, the corresponding point searching section may determine a corresponding point from the second correlation peak having the ratio larger than the predetermined value, and may determine a corresponding point from the first correlation peak.

Even if two correlation peaks seem to appear, as far as the correlation value of the second correlation peak is smaller than the correlation value of the first correlation peak, it is highly likely that the first correlation peak represents a corresponding point. In view of the above, in the above configuration, a corresponding point is determined only with use of the first correlation peak. This increases the possibility of obtaining one sharp correlation peak in an upper layer.

(3) Preferably, the corresponding point searching section may calculate the correlation value with use of a phase-only correlation method.

According to the above configuration, a correlation value is calculated with use of a phase-only correlation method having a feature that a sharp correlation peak appears. Accordingly, this enhances the detection precision of a correlation peak, and is advantageous in performing a corresponding point search with high precision.

(4) Preferably, the corresponding point searching section may determine a largest correlation value among the correlation values as the first correlation peak, and may determine a correlation value smaller than the largest correlation value but larger than a predetermined value as the second correlation peak.

According to the above configuration, at least one correlation peak is detected. Accordingly, it is possible to prevent discontinuation of a corresponding point search in a layer somewhere between the lowermost layer and the uppermost layer. Further, according to the above configuration, a position at which the correlation value is smaller than a predetermined value is not determined to be the second correlation peak. This makes it possible to perform a corresponding point search, while excluding a correlation peak which is less likely to serve as a solution. This is advantageous in reducing the processing cost.

(5) Preferably, the corresponding point searching section may determine a correlation value at an apex of a peak as a correlation peak in a distribution of the correlation values.

According to the above configuration, it is possible to detect a correlation peak with high precision.

(6) Preferably, the corresponding point searching section may determine that a correlation peak appears at a target position in the search region, in the case where a ratio of a correlation value at a position adjacent to the target position to a correlation value at the target position is not larger than a predetermined value.

According to the above configuration, it is determined that a correlation peak appears at a certain position having a sufficiently large correlation value as compared with a correlation value at a position in the vicinity of the certain position. Accordingly, it is possible to prevent detection of a correlation value at a position other than the apex of a peak, as a correlation peak. This is advantageous in detecting a correlation peak with high precision.

(7) Preferably, the corresponding point searching section may determine that a correlation peak appears at a target position in the search region, in the case where a difference value obtained by subtracting a correlation value at a position adjacent to the target position from a correlation value at the target position is larger than a predetermined value.

According to the above configuration, it is determined that a correlation peak appears at a certain position having a sufficiently large correlation value as compared with a correlation value at a position in the vicinity of the certain position. Accordingly, it is possible to prevent detection of a correlation value at a position other than the apex of a peak, as a correlation peak. This is advantageous in detecting a correlation peak with high precision.

(8) Preferably, the corresponding point searching section may detect a correlation peak at a position away by a predetermined distance or more.

According to the above configuration, it is possible to prevent detection of a correlation peak at the adjacent position. This is advantageous in detecting a correlation peak with high precision.

(9) Preferably, in the case where the initial position setter determines plural initial search positions in the reference image of the target layer, the corresponding point searching section may set the search region with respect to each of the initial search positions as a reference, and even in the case where the corresponding point searching section retrieves plural corresponding points in each of the search regions, the initial position setter may set an initial search position with respect to all the corresponding points in the reference image of a layer immediately higher than the target layer.

According to the above configuration, it is possible to avoid a case that a true corresponding point serving as a solution is excluded from the candidates. This is advantageous in enhancing the search precision of a corresponding point.

(10) Preferably, in the case where the number of corresponding points searched in the target layer by the corresponding point searching section exceeds a predetermined upper limit, the initial position setter may set the initial search position with respect to the corresponding points of a number not larger than the upper limit.

According to the above configuration, it is possible to prevent a case that an extremely large number of corresponding points are detected in an upper layer, and it may be difficult to select a true corresponding point as a final solution.

(11) Preferably, the corresponding point searching section may determine one corresponding point in an uppermost layer.

According to the above configuration, it is possible to securely determine one corresponding point in a final stage of processing.

The invention claimed is:

1. A corresponding point searching apparatus, comprising:
   an image acquirer which acquires one of at least two input images as a standard image, and a rest of the input images as a reference image;
   a multi-resolution image generator which hierarchically generates a plurality of standard images having resolutions different from each other and a plurality of reference images having resolutions different from each other respectively from the standard image and the reference image acquired by the image acquirer;
   a corresponding point searching section which searches a corresponding point corresponding to a target point in a standard image of a target layer from a reference image of the target layer;
   an initial position setter which sets an initial search position in the reference image of the target layer, based on a corresponding point searched in a layer immediately lower than the target layer; and
   a search controller which causes the corresponding point searching section to sequentially search a corresponding point from a lower layer toward an upper layer, wherein
   the corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear, and
   in the case where the corresponding point searching section retrieves plural corresponding points, the initial position setter sets the initial search position with respect to each of the corresponding points,
   in the case where it is determined that plural correlation peaks appear, the corresponding point searching section calculates a ratio of a correlation value of a second correlation peak other than a first correlation peak to a correlation value of the first correlation peak at which the correlation value is largest,
   in the case where the second correlation peak having the ratio larger than a predetermined value is not present, the corresponding point searching section determines a corresponding point only from the first correlation peak, and
   in the case where the second correlation peak having the ratio larger than the predetermined value is present, the corresponding point searching section determines a corresponding point from the second correlation peak having the ratio larger than the predetermined value, and determines a corresponding point from the first correlation peak.

2. The corresponding point searching apparatus according to claim 1, wherein
   the corresponding point searching section calculates the correlation value with use of a phase-only correlation method.

3. The corresponding point searching apparatus according to claim 1, wherein
   the corresponding point searching section determines a largest correlation value among the correlation values as the first correlation peak, and determines a correlation value smaller than the largest correlation value but larger than a predetermined value as the second correlation peak.

4. The corresponding point searching apparatus according to claim 1, wherein
   the corresponding point searching section determines a correlation value at an apex of a peak as a correlation peak in a distribution of the correlation values.

5. A corresponding point searching apparatus, comprising:
   an image acquirer which acquires one of at least two input images as a standard image, and a rest of the input images as a reference image;
   a multi-resolution image generator which hierarchically generates a plurality of standard images having resolutions different from each other and a plurality of reference images having resolutions different from each other respectively from the standard image and the reference image acquired by the image acquirer;
a corresponding point searching section which searches a corresponding point corresponding to a target point in a standard image of a target layer from a reference image of the target layer;
an initial position setter which sets an initial search position in the reference image of the target layer, based on a corresponding point searched in a layer immediately lower than the target layer; and
a search controller which causes the corresponding point searching section to sequentially search a corresponding point from a lower layer toward an upper layer, wherein
the corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear, and
in the case where the corresponding point searching section retrieves plural corresponding points, the initial position setter sets the initial search position with respect to each of the corresponding points,
the corresponding point searching section determines that a correlation peak appears at a target position in the search region, in the case where a ratio of a correlation value at a position adjacent to the target position to a correlation value at the target position is not larger than a predetermined value.

6. A corresponding point searching apparatus, comprising:
an image acquirer which acquires one of at least two input images as a standard image, and a rest of the input images as a reference image;
a multi-resolution image generator which hierarchically generates a plurality of standard images having resolutions different from each other and a plurality of reference images having resolutions different from each other respectively from the standard image and the reference image acquired by the image acquirer;
a corresponding point searching section which searches a corresponding point corresponding to a target point in a standard image of a target layer from a reference image of the target layer;
an initial position setter which sets an initial search position in the reference image of the target layer, based on a corresponding point searched in a layer immediately lower than the target layer; and
a search controller which causes the corresponding point searching section to sequentially search a corresponding point from a lower layer toward an upper layer, wherein
the corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear, and
in the case where the corresponding point searching section retrieves plural corresponding points, the initial position setter sets the initial search position with respect to each of the corresponding points,
the corresponding point searching section determines that a correlation peak appears at a target position in the search region, in the case where a difference value obtained by subtracting a correlation value at a position adjacent to the target position from a correlation value at the target position is larger than a predetermined value.

7. The corresponding point searching apparatus according to claim 1, wherein
the corresponding point searching section detects a correlation peak at a position away by a predetermined distance or more.

8. A corresponding point searching apparatus, comprising:
an image acquirer which acquires one of at least two input images as a standard image, and a rest of the input images as a reference image;
a multi-resolution image generator which hierarchically generates a plurality of standard images having resolutions different from each other and a plurality of reference images having resolutions different from each other respectively from the standard image and the reference image acquired by the image acquirer;
a corresponding point searching section which searches a corresponding point corresponding to a target point in a standard image of a target layer from a reference image of the target layer;
an initial position setter which sets an initial search position in the reference image of the target layer, based on a corresponding point searched in a layer immediately lower than the target layer; and
a search controller which causes the corresponding point searching section to sequentially search a corresponding point from a lower layer toward an upper layer, wherein
the corresponding point searching section sets a predetermined search region in the reference image of the target layer by using the initial search position set in the target layer as a reference, calculates a correlation value with respect to the target point at each of positions in the set search region, determines whether plural correlation peaks appear based on the calculated correlation value, and determines plural corresponding points with use of each of the correlation peaks, in the case where the corresponding point searching section determines that plural correlation peaks appear, and
in the case where the corresponding point searching section retrieves plural corresponding points, the initial position setter sets the initial search position with respect to each of the corresponding points,
in the case where the initial position setter determines plural initial search positions in the reference image of the target layer, the corresponding point searching section sets the search region with respect to each of the initial search positions as a reference, and
even in the case where the corresponding point searching section retrieves plural corresponding points in each of the search regions, the initial position setter sets an initial search position with respect to all the corresponding points in the reference image of a layer immediately higher than the target layer.

9. The corresponding point searching apparatus according to claim 1, wherein
in the case where the number of corresponding points searched in the target layer by the corresponding point searching section exceeds a predetermined upper limit, the initial position setter sets the initial search position with respect to the corresponding points of a number not larger than the upper limit.

10. The corresponding point searching apparatus according to claim 1, wherein
the corresponding point searching section determines one corresponding point in an uppermost layer.

11. The corresponding point searching apparatus according to claim 1, wherein
the corresponding point searching section determines that a correlation peak appears at a target position in the search region, in the case where a ratio of a correlation value at a position adjacent to the target position to a correlation value at the target position is not larger than a predetermined value.

12. The corresponding point searching apparatus according to claim 1, wherein
the corresponding point searching section determines that a correlation peak appears at a target position in the search region, in the case where a difference value obtained by subtracting a correlation value at a position adjacent to the target position from a correlation value at the target position is larger than a predetermined value.

13. The corresponding point searching apparatus according to claim 1, wherein
the corresponding point searching section detects a correlation peak at a position away by a predetermined distance or more.

14. The corresponding point searching apparatus according to claim 1, wherein
in the case where the initial position setter determines plural initial search positions in the reference image of the target layer, the corresponding point searching section sets the search region with respect to each of the initial search positions as a reference, and
even in the case where the corresponding point searching section retrieves plural corresponding points in each of the search regions, the initial position setter sets an initial search position with respect to all the corresponding points in the reference image of a layer immediately higher than the target layer.

15. The corresponding point searching apparatus according to claim 11, wherein
the corresponding point searching section determines that a correlation peak appears at a target position in the search region, in the case where a difference value obtained by subtracting a correlation value at a position adjacent to the target position from a correlation value at the target position is larger than a predetermined value.

16. The corresponding point searching apparatus according to claim 15, wherein
the corresponding point searching section detects a correlation peak at a position away by a predetermined distance or more.

17. The corresponding point searching apparatus according to claim 16, wherein
in the case where the initial position setter determines plural initial search positions in the reference image of the target layer, the corresponding point searching section sets the search region with respect to each of the initial search positions as a reference, and
even in the case where the corresponding point searching section retrieves plural corresponding points in each of the search regions, the initial position setter sets an initial search position with respect to all the corresponding points in the reference image of a layer immediately higher than the target layer.

18. The corresponding point searching apparatus according to claim 17, wherein
in the case where the number of corresponding points searched in the target layer by the corresponding point searching section exceeds a predetermined upper limit, the initial position setter sets the initial search position with respect to the corresponding points of a number not larger than the upper limit.

19. The corresponding point searching apparatus according to claim 3, wherein
in the case where the initial position setter determines plural initial search positions in the reference image of the target layer, the corresponding point searching section sets the search region with respect to each of the initial search positions as a reference, and
even in the case where the corresponding point searching section retrieves plural corresponding points in each of the search regions, the initial position setter sets an initial search position with respect to all the corresponding points in the reference image of a layer immediately higher than the target layer.

* * * * *